(12) United States Patent
Karri et al.

(10) Patent No.: US 7,212,495 B2
(45) Date of Patent: May 1, 2007

(54) SIGNALING FOR RESERVING A COMMUNICATIONS PATH

(75) Inventors: Ramesh Karri, New York, NY (US); Malathi Veeraraghavan, Atlantic Highlands, NJ (US); Brian Douglas, San Jose, CA (US); Haobo Wang, Brooklyn, NY (US)

(73) Assignee: Polytechnic University, Brooklyn, NY (US)

( * ) Notice: Subject to any disclaimer, the term of this patent is extended or adjusted under 35 U.S.C. 154(b) by 836 days.

(21) Appl. No.: 10/081,880

(22) Filed: Feb. 21, 2002

(65) Prior Publication Data

US 2002/0196808 A1 Dec. 26, 2002

Related U.S. Application Data

(60) Provisional application No. 60/270,399, filed on Feb. 21, 2001.

(51) Int. Cl.
*G01R 31/08* (2006.01)

(52) U.S. Cl. .................. 370/238; 370/442; 709/239

(58) Field of Classification Search .............. None
See application file for complete search history.

(56) References Cited

U.S. PATENT DOCUMENTS

| | | | | |
|---|---|---|---|---|
| 5,359,649 A | * | 10/1994 | Rosu et al. | ............ 379/221.07 |
| 5,881,050 A | * | 3/1999 | Chevalier et al. | ........... 370/230 |
| 6,363,319 B1 | * | 3/2002 | Hsu | .......................... 701/202 |
| 6,594,265 B1 | * | 7/2003 | Etorre et al. | ........... 370/395.51 |
| 2004/0042402 A1 | * | 3/2004 | Galand et al. | .............. 370/237 |

* cited by examiner

*Primary Examiner*—Doris H. To
*Assistant Examiner*—Thien D. Tran
(74) *Attorney, Agent, or Firm*—Straub and Pokotylo; John C. Pokotylo

(57) ABSTRACT

A call signaling protocol that uses simplified messaging to set up, confirm set up, tear down, and confirm tear down of a connection. The available capacity of communications links is tracked so that it can be quickly determined whether or not a link can handle a call. Segments (e.g., time slots, wavelengths, etc.) of a link having enough available capacity are allocated by a separate operation. Connection state information is also tracked. The simple messages and information used by the signaling protocol permits it to be easily implemented in hardware. Such an implementation enables high-speed, high-capacity, call signaling.

20 Claims, 27 Drawing Sheets

100

300

700

Switch Mapping Table 900

| INDEX | | RETURN / WRITTEN VALUE | | | |
|---|---|---|---|---|---|
| OWN CONNECTION REFERENCE | SEQUENTIAL OFFSET (0 to RW-1) | INCOMING CHANNEL IDENTIFIER | | OUTGOING CHANNEL IDENTIFIER | |
| | | TIME-SLOT | INTERFACE | TIME-SLOT | INTERFACE |

FIGURE 9

State Table 1000

| INDEX | RETURN / WRITTEN VALUE | | | |
|---|---|---|---|---|
| OWN CONNECTION REFERENCE | CONNECTION REFERENCE | | STATE | BANDWIDTH |
| | PREVIOUS | NEXT | | |

FIGURE 10

Connectivity Table 1100

| INDEX | RETURN VALUE |
|---|---|
| NEIGHBOR ADDRESS | OWN INTERFACE # |

FIGURE 11

Routing Table 1200

| INDEX | RETURN VALUE | |
|---|---|---|
| DESTINATION ADDRESS | REQUESTED BANDWIDTH | OPTION # | NEXT NODE ADDRESS |

FIGURE 12

Connection Admission Control (CAC) Table 1300

| INDEX | RETURN / WRITTEN VALUE | |
|---|---|---|
| NEXT NODE ADDRESS | NEXT NODE INTERFACE# | TOTAL BANDWIDTH | AVAILABLE BANDWIDTH |

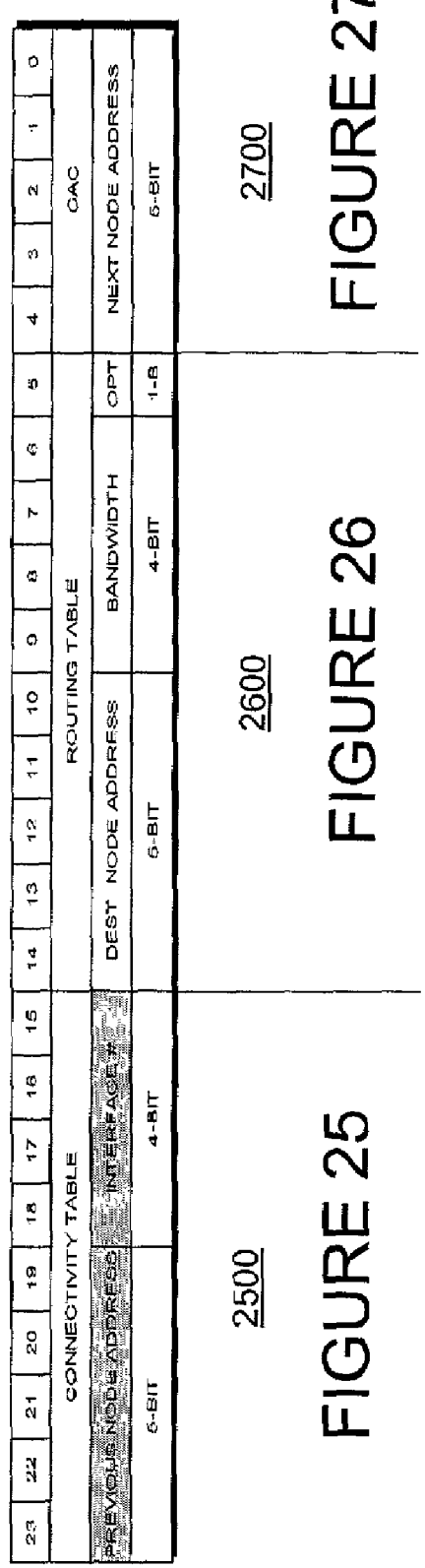

FIGURE 28

| INDEX | RETURN / WRITTEN VALUE | | | | |
|---|---|---|---|---|---|
| OWN CONNECTION REFERENCE 5-BIT | CONNECTION REFERENCE 5-BIT (EACH) | | STATE 2-BIT | BANDWIDTH 4-BIT | NODE ADDRESS 5-BIT (EACH) | OWN CONNECTION REFERENCE 5-Bit |
| | PREVIOUS | NEXT | | | Previous | NEXT | |

FIGURE 29

| INDEX | | RETURN / WRITTEN VALUE | | | |
|---|---|---|---|---|---|
| OWN CONNECTION REFERENCE 5-BIT | SEQUENTIAL OFFSET (0 to BW-1) 4-BIT | INCOMING CHANNEL IDENTIFIER 8-BIT | | OUTGOING CHANNEL IDENTIFIER 8-BIT | |
| | | INTERFACE | TIME-SLOT | INTERFACE | TIME-SLOT |

Table 1: Chip Select and Write Enable

| CS_N | WE_N | ACTION |
|---|---|---|
| 0 | 0 | Write |
| 0 | 1 | Read |
| 1 | 0 | Pause |
| 1 | 1 | No action/High Impedance |

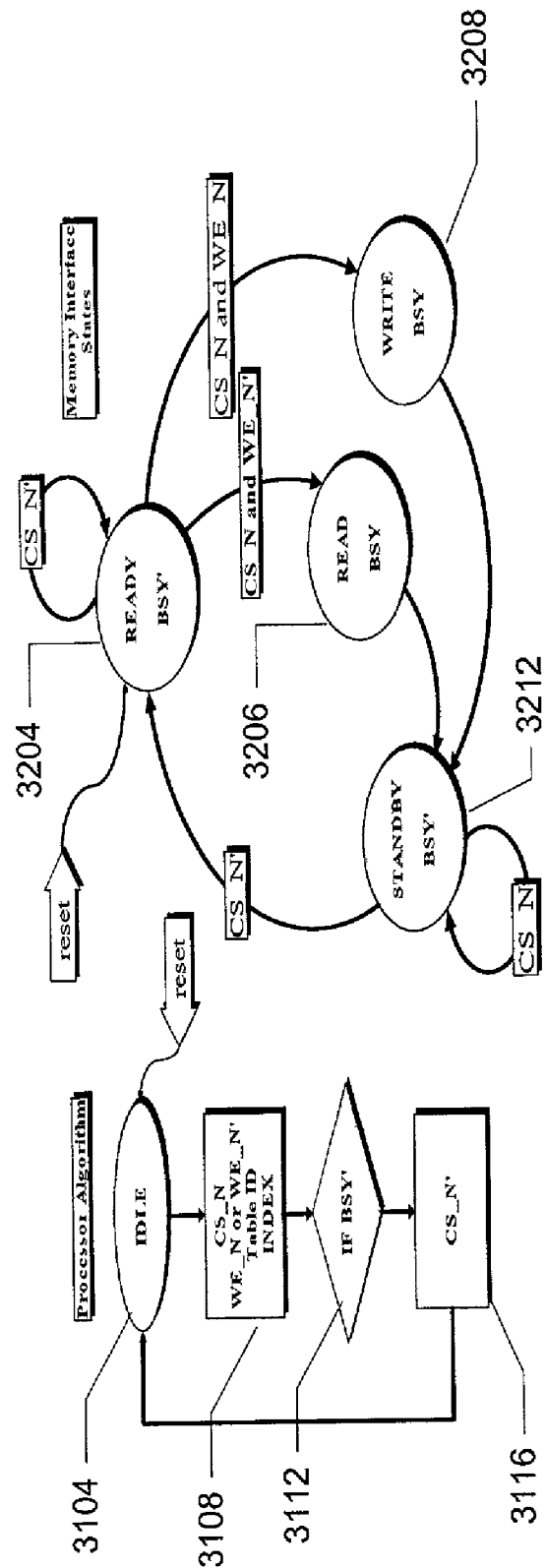

| Type | | Operations and Cycles | | | | | | | Total |
|---|---|---|---|---|---|---|---|---|---|
| Setup | Op | RX | RD route & CAC | WR CAC | RD Conn | RD Cxn ref | RD TS & WR switch | WR State | TX | 77-101* |
| | cycles | 12 | 8-32* | 2 | 4 | 2 | 36 | 1 | 12 | |
| Setup success | Op | RX | RD State | | | | | WR State | TX | 9 |
| | cycles | 3 | 2 | | | | | 1 | 3 | |
| Release | Op | RX | RD State | RD CAC & WR CAC | | | RD Switch & WR TS | WR State | TX | 51 |
| | cycles | 3 | 2 | 6 | | | 36 | 1 | 3 | |
| Release confirm | Op | RX | RD State | | | WR Cxn ref | | WR State | TX | 10 |
| | cycles | 3 | 2 | | | 1 | | 1 | 3 | |

FIGURE 37

SIGNALING FOR RESERVING A COMMUNICATIONS PATH

§ 0. RELATED APPLICATIONS

Benefit is claimed, under 35 U.S.C. § 119(e)(1), to the filing date of provisional patent application Ser. No. 60/270, 399, entitled "HARDWARE IMPLEMENTATION OF A SIGNALING PROTOCOL", filed on Feb. 21, 2001 and listing Ramesh Karri, Malathi Veeraraghavan, Brian Douglas and Haobo Wang as the inventors, for any inventions disclosed in the manner provided by 35 U.S.C. § 112, ¶ 1. This provisional application is expressly incorporated herein by reference. However, the invention is not intended to be limited by any statements in that provisional application. Rather, that provisional application should be considered to describe exemplary embodiments of the invention.

§ 1. BACKGROUND OF THE INVENTION

§ 1.1 Field of the Invention

The present invention concerns signaling used to reserve a communications path having certain characteristics. More specifically, the present invention concerns, a high-speed, high capacity call signaling protocol.

§ 1.2 Description of Related Art

The description of art in this section is not, and should not be interpreted to be, an admission that such art is prior art to the present invention. Circuit switched and packet switched networks are introduced in §1.2.1. The need for label switched paths, their operation, and their establishment is introduced in § § 1.2.2–1.2.4, respectively. Finally, the need for higher capacity, high speed call signaling is introduced § 1.2.5.

§1.2.1 Circuit Switched Networks and Packet Switched Networks

Circuit switched networks establish a connection between hosts (parties to a communication) for the duration of their communication ("call"). The public switched telephone network ("PSTN") is an example of a circuit switched network, where parties to a call are provided with a connection for the duration of the call. Hence, circuit switched networks are said to be "connection-oriented". Unfortunately, many communications applications, circuit switched networks use network resources inefficiently. Consider for example, the communications of short, infrequent "bursts" of data between hosts. Providing a connection for the duration of a call between such hosts simply wastes communications resources when no data is being transferred. Such inefficiencies have lead to "connectionless" packet switched networks.

Packet switched networks traditionally forward addressed data (referred to as "packets" in the specification below without loss of generality), typically on a best efforts basis, from a source to a destination. Many large packet switched networks are made up of interconnected nodes (referred to as "routers" in the specification below without loss of generality). The routers may be geographically distributed throughout a region and connected by links (e.g., optical fiber, copper cable, wireless transmission channels, etc.). In such a network, each router typically interfaces with (e.g., terminates) multiple links.

Packets traverse the network by being forwarded from router to router until they reach their destinations (as typically specified by so-called layer-3 addresses in the packet headers). Unlike switches, which establish a connection for the duration of a "call" or "session" to send data received on a given input port out on a given output port, routers determine the destination addresses of received packets and, based on these destination addresses, determine, in each case, the appropriate link on which to send them. Hence, such networks are said to be "connectionless". Routers may use protocols to discover the topology of the network, and algorithms to determine the most efficient ways to forward packets towards a particular destination address(es). Since the network topology can change, packets destined for the same address may be routed differently. Such packets can even arrive out of sequence.

§ 1.2.2 The Need for Label Switched Paths

In some cases, it may be considered desirable to establish a fixed path through at least a part of a packet switched network for at least some packets. More specifically, merely using known routing protocols (e.g., shortest path algorithms) to determine paths is becoming unacceptable in light of the ever-increasing volume of Internet traffic and the mission-critical nature of some Internet applications. Such known routing protocols can actually contribute to network congestion if they do not account for bandwidth availability and traffic characteristics when constructing routing (and forwarding) tables.

Traffic engineering permits network administrators to map traffic flows onto an existing physical topology. In this way, network administrators can move traffic flows away from congested shortest paths to a less congested path, or paths. Alternatively, paths can be determined autonomously, even on demand. Label-switching can be used to establish a fixed path from a head-end node (e.g., an ingress router) to a tail-end node (e.g., an egress router). The fixed path may be determined using known signaling protocols such as RSVP and LDP. Once a path is determined, each router in the path may be configured (manually, or via some signaling mechanism) to forward packets to a peer (e.g., a "downstream" or "upstream" neighbor) router in the path. Routers in the path determine that a given set of packets (e.g., a flow) are to be sent over the fixed path (as opposed to being routed individually) based on unique labels added to the packets. Analogs of label switched paths can also be used in circuit switched networks. For example, generalized MPLS (GM-PLS) can be used in circuit switched networks having switches, optical cross-connects, SONET/SDH cross-connects, etc. In MPLS a label is provided, explicitly, in the data. However, in GMPLS, a label to be associated with data can be provided explicitly, in the data, or can be inferred from something external to the data, such as a port on which the data was received, or a time slot in which the data was carried, for example.

§ 1.2.3 Operations of Label Switched Paths

Recognizing that the operation of forwarding a packet, based on address information, to a next hop can be thought of as two steps—partitioning the entire set of possible packets or, other data to be communicated (referred to as "packets" in the specification without loss of generality), into a set of forwarding equivalence classes ("FECs"), and mapping each FEC to a next hop. As far as the forwarding decision is concerned, different packets which get mapped to the same FEC are indistinguishable. In one technique concerning label switched paths, dubbed "multiprotocol label switching" (or "MPLS"), a particular packet is assigned to a particular FEC just once, as the packet enters the label-switched domain (part of the) network. The FEC to which the packet is assigned is encoded as a label, typically a short, fixed length value. Thus, at subsequent nodes, no further header analysis need be done—all subsequent forwarding over the label-switched domain is driven by the labels. A label-switched path is defined by the concatenation of one or more label-switched hops, allowing a packet to be forwarded from one label-switching router (LSR) to another across the MPLS domain.

Recall that a label may be a short, fixed-length value carried in the packet's header (or may be inferred from something external to the data such as the port number on which the data was received (e.g., in the case of optical cross-connects), or the time slot in which the data was carried (e.g., in the case of SONET/SDH cross connects) of addressed data or of a cell) to identify a forwarding equivalence class (or "FEC"). Recall further that a FEC is a set of packets (or more generally data) that are forwarded over the same path through a network, sometimes even if their ultimate destinations are different. At the ingress edge of the network, each packet is assigned an initial label (e.g., based on all or a part of its layer 3 destination address). More specifically, an ingress label-switching router interprets the destination address of an unlabeled packet, performs a longest-match routing table lookup, maps the packet to an FEC, assigns a label to the packet and forwards it to the next hop in the label-switched path.

In the MPLS domain, the label-switching routers (LSRs) ignore the packet's network layer header and simply forward the packet using label-swapping. More specifically, when a labeled packet arrives at a label-switching router (LSR), the input port number and the label are used as lookup keys into an MPLS forwarding table. When a match is found, the forwarding component retrieves the associated outgoing label, the outgoing interface (or port), and the next hop address from the forwarding table. The incoming label is replaced with the outgoing label and the packet is directed to the outgoing interface for transmission to the next hop in the label-switched path.

When the labeled packet arrives at the egress label-switching router, if the next hop is not a label-switching router, the egress label-switching router discards ("pops") the label and forwards the packet using conventional longest-match IP forwarding.

§ 1.2.4 Establishing Label Switched Paths

In the foregoing example, each label-switching router had appropriate forwarding labels. However, these labels must be provided to the label-switching routers in some way. Although labels may be manually assigned on all routers involved in the path, in which case no signaling operations by the nodes are needed, in most cases, the signaling protocols are used to set up a path and distribute labels. For example, the label distribution protocol (LDP) and the resource reservation protocol (RSVP) have been used to signal paths. Nodes using these signaling protocols basically use a FEC to bind a label with a received label, and communicate a {label,FEC} binding to a peer or neighbor node, to establish of a label-switched path. Most signaling protocols are implemented in software. However, such software implementation limits the speed at which paths can be established (or at which calls can be set up and torn down).

§ 1.2.5 The Need for Higher Capacity, Higher Speed Call Signaling

Connection (or call) setup and release procedures and the associated message exchanges constitute a signaling protocol. A controller in the switch processes the signaling messages and programs the switch fabric. Setting up a connection in a connection-oriented network basically includes four steps. First, a path for the connection is determined. Routing tables created from data collected by the routing protocols may be used for determining segments or links of such a path. Second, connection admission control (CAC) may be performed. CAC procedure determines if the resources requested by the call are available, reserves these resources, and selects channel identifiers (e.g., interface numbers and time slots in Time Division Multiplexed (TDM) circuit switches; interface numbers and wavelength numbers in WDM circuit switches; interface numbers, Virtual Path Identifiers/Virtual Channel Identifiers in ATM switches; interface numbers and labels in MultiProtocol Label Switches; a combination of source and destination IP addresses, source and destination port numbers, protocol type, in IP switches). Third, switch fabrics (or forwarding information) of switches or nodes in the path are programmed. This may entail programming schedulers and creating table entries that map incoming channel identifiers to outgoing channel identifiers. Fourth, the state information of active connections is updated and connection references are managed.

Following data transfer, releasing the resources reserved for the connection tears down a connection. This entails deleting the connection entries from the various data tables.

Generally, existing signaling protocol messages are complex with many parameters. Furthermore, state information associated with individual calls can become unwieldy. Consequently, such signaling protocols have traditionally been implemented in software. The call handling capacities of such software-implemented signaling protocols is on the order of 1000–10,000 calls/sec.

The need to speed up call or connection signaling, and to increase the capacity of call signaling, in both packet-switched and circuit switched networks, is now introduced.

Given industry momentum to transport voice telephony traffic over packet-switched networks, there is an increasing need for delay guarantees for interactive sessions. Interactive voice traffic has a one-way maximum delay requirement of 150 ms for excellent quality voice and 400 ms for acceptable quality voice. These delay guarantees are difficult to provide in connectionless IP networks and is a primary driver for connection-oriented packet-switched networks.

Telecommunications service providers are deploying ATM networks with TDM-ATM gateways to relieve the capacity exhaust problem in their tandem switches that interconnect central offices. On-demand setup and release of ATM virtual circuits is needed to support the large number of voice calls. Consider admitting voice calls into a Fore Systems' ASX-4000 ATM switch which has a 40 Gbps switch fabric and which supports a maximum of 224 ports. In the worst case, when all virtual circuits are for voice calls that use of 32 Kbps voice coding, 1.25M (=40 Gbps/32 Kbps) calls can be held simultaneously. The mean holding time of voice calls has been measured to be 3 minutes. To keep the switch interfaces fully loaded, the signaling protocol processor should handle 1.25M/180 sec=7000 calls/sec. If 8 Kbps voice coding is used, then this number increases to 28000 calls/sec. This example illustrates the need for scalable, high-capacity, call/connection signaling protocols.

In practice, all flows are not voice calls, and hence arguably, the call handling capacities of switches need not be as high as projected. However, telephony voice is just one form of interactive communication. Supporting human-to-computer and computer-to-computer interactive communications on connection-oriented networks will require scaling of call handling capacities. The delay needs of human-to-computer interactive applications such as telnet and web accesses have been studied. For the telnet application, a delay of 200 ms has been reported. Empirical data also shows that only 10 KB are exchanged per flow on average. A 1 Tb/s switch could handle 100M of such flows/sec in the limit. The inventors believe that a software implementation of RSVP cannot support flow-based QoS control of such a large number of flows.

Some believe that a trend back to circuit switching will occur because they assume that bandwidth will soon become a commodity. Very large WDM switch fabrics and support for large number of wavelengths per fiber confirm this trend. If bandwidth becomes a commodity, sending data in packets to exploit silences in bursty traffic will become unimportant. Instead a lightpath can be set up end-to-end in an all-optical bit-rate-transparent WDM network. The ability to set up and release lightpaths on demand to allow for sharing of resources at the call level is the technology that would enable this.

Switched lightpaths (i.e., lightpaths set up and released on-demand) have already been proposed. Bandwidth trading services allow customers to trade bandwidth for wire service on a daily and even hourly basis. Optical Networks has proposed dynamic management of lightpaths in its Optical Link Management Protocol (OLMP) suite. Switched lightpaths can also be used for web mirroring. If holding times of lightpaths are long (as in leased lines) or if the number of lightpaths needed are small (as in initial web mirroring deployments), the call handling capacities of WDM switches could be managed by implementing signaling protocols in software. However, in the near future the present inventors believe that bandwidth trading will occur on a per-second basis and that the use of personal web site mirrors will become widespread. To support these emerging applications, call-handling capacities of WDM switches should be at least an order of magnitude higher than that afforded by software implemented signaling protocols.

WDM lightpaths are ideal for large end-to-end bulk-data transfers. In 1975, Miyahara and Schwartz showed that for large file transfers, at comparable data rates, circuit-switched networks outperform packet-switched networks from both a delay and throughput point of view. Since there is no burstiness involved in such bulk transfers of stored files from one computer to another, high-bandwidth WDM lightpaths can be set up on demand and released after downloading the file (the application data is transported directly on the WDM layer without TCP/IP). This implies that given the large number of end hosts, large call handling capacities could indeed be needed. Consider using a 1152×1152 Xros optical switch. Assuming that 10 MB files are transferred at 10 Gb/s in the worst case and assuming that end hosts can keep up with data arriving at this rate, a call handling capacity of $(1152 \times (10 \times 8)) \times 10$ ms=14400 calls/sec is required.

Fore Systems' ASX-4000 switch supports 1200 calls/sec and about 100,000 connections. In Tb/s switch fabrics these numbers will increase by another two orders of magnitude.

YESSIR can support 1550 voice over IP calls/sec. An OC-3 connection can support 2400 64 Kb/s voice calls. Hence, in the worst case a Tb/s IP router should support over 15 million simultaneous calls (when all IP flows are voice calls).

Toward building large-scale switches, the current industry focus is on increasing packet handling capacities of switch fabrics from Gb/s to Tb/s. Although an increase in packet handling capacities and line card data rates requires a corresponding increase in call handling capacities of switches, this problem has received little attention. This is because most of the work on scalability of packet switch fabrics has targeted connectionless internet protocol (IP) routers, while call handling arises only in connection-oriented networks. However, in the last few years, resource reservation to support Quality-of-Service (QoS) guaranteed flows has gained attention. Internet Engineering Task Force (IETF) is addressing this issue by augmenting IP routers with connection-oriented capabilities.

QoS control solutions such as Integrated Services (Intserv) and Differentiated Services (Diffserv) are being developed and evaluated based on the premise that call handling capacities do not scale with packet handling capacities of switch fabrics. This assumption has also relegated circuit-switched networks, including high-speed Wavelength Division Multiplexed (WDM) networks, to just serve as wires.

As can be appreciated from the foregoing examples and trends, the time for call or connection signaling should be decreased, and the capacity of call signaling should be increased. This is particularly true given the increasing capacity, both in terms of number of calls that can be services and connection throughput, of switches and routers.

§ 2. SUMMARY OF THE INVENTION

The present invention provides a call signaling protocol that uses simplified messaging and novel data structures. Messages may include messages to set up, confirm set up, tear down, and confirm tear down of a connection.

The available capacity of communications links may be tracked so that it can be quickly determined whether or not a link can handle a call.

Segments (e.g., time slots, wavelengths, etc.) of a link having enough available capacity may be allocated by a separate operation. Connection state information is also tracked.

The signaling protocol can be implemented in hardware. Such an implementation enables high-speed, high-capacity, call signaling.

§ 3. BRIEF DESCRIPTION OF THE DRAWINGS

FIG. 9 illustrates an exemplary switch mapping table that may be managed by a call switching method of the present invention.

FIG. 10 illustrates an exemplary state table that may be managed by a call switching method of the present invention.

FIG. 11 illustrates an exemplary connectivity table that may be managed by a call switching method of the present invention.

FIG. 12 illustrates an exemplary routing table that may be used by the present invention.

FIG. 13 illustrates an exemplary connection admission control (CAC) table that may be managed by a call switching method of the present invention.

FIG. 25 illustrates an exemplary connectivity table implemented in an exemplary embodiment of the present invention.

FIG. 26 illustrates an exemplary routing table implemented in an exemplary embodiment of the present invention.

FIG. 27 illustrates an exemplary CAC table implemented in an exemplary embodiment of the present invention.

FIG. 28 illustrates an exemplary state table implemented in an exemplary embodiment of the present invention.

FIG. 29 illustrates an exemplary switch mapping table implemented in an exemplary embodiment of the present invention.

FIG. 30 illustrates different control signals to access memory.

FIGS. 31 and 32 illustrate different states of a processor and a memory interface.

FIG. 37 is a table summarizing the results of the timing diagrams of FIGS. 33–36.

§ 4. DETAILED DESCRIPTION

The present invention involves methods, apparatus and data structures for providing a high-speed, high capacity signaling protocol. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown and the inventors regards their invention as the following disclosed methods, apparatus and data structures and any other patentable subject matter.

In the following, an exemplary environment in which the present invention may operate is described in § 4.1. Then, high-level operations and states of the present invention are described in § 4.2. Thereafter, exemplary methods, data structures and apparatus that may be used to effect those operations are described in § 4.3. Examples illustrating operations preformed by exemplary embodiments of the invention are then provided in § 4.4. The results of a simulation performed on the exemplary embodiment are described in § 4.5. Finally, some conclusions regarding the present invention are set forth in § 4.6.

§ 4.1 Environment in Which the Present Invention May Operate

The present invention may be used in communication networks including nodes for forwarding addressed data, such as packets. The present invention may be used to configure such nodes for potential dedicated connections between two host devices.

Figure 1:
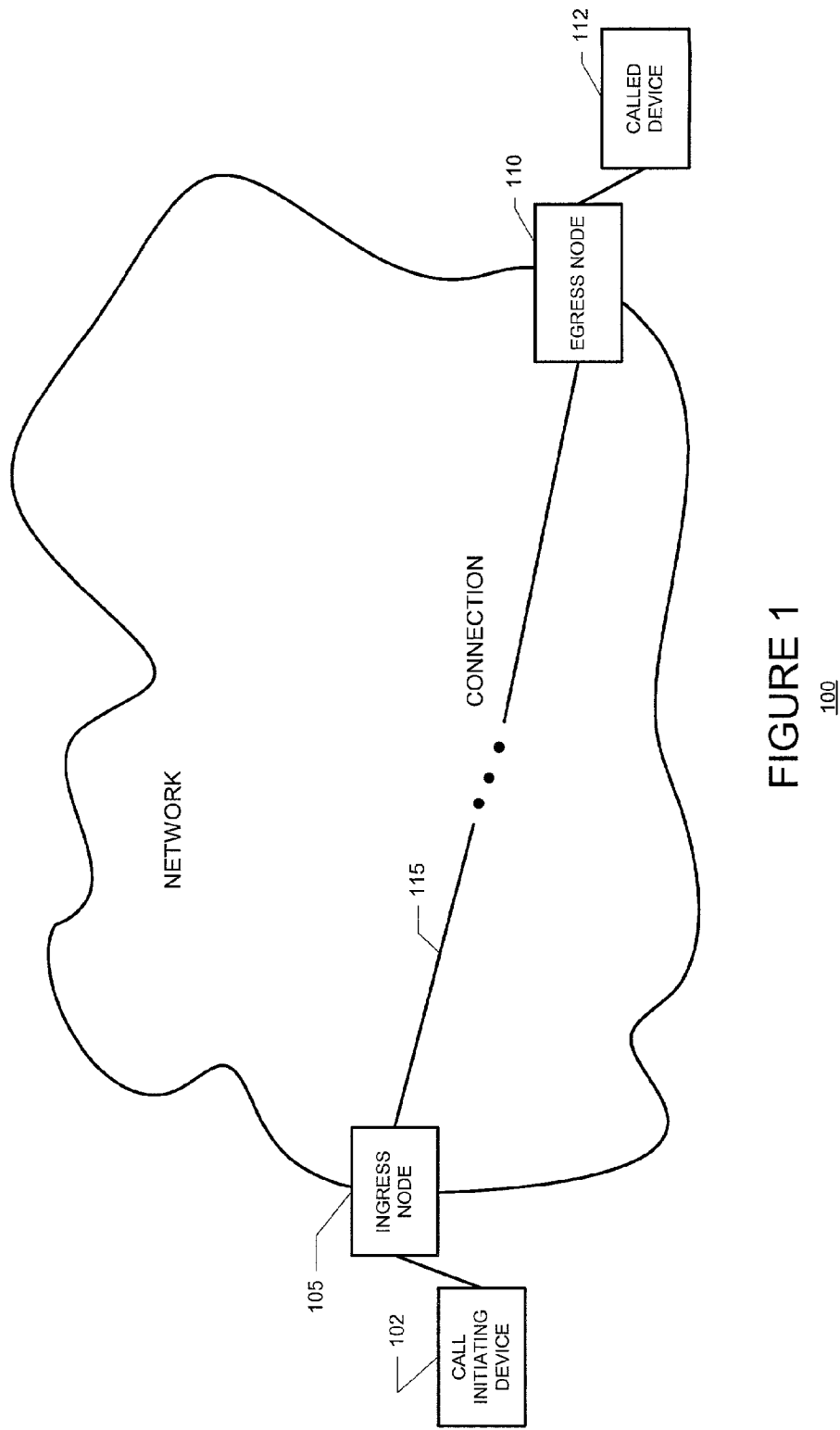
FIG. 1 illustrates an communications network in which the present invention may operate.

FIG. 1 includes an exemplary communications network (or transport network) 100 in which the present invention may operate. The network 100 includes an ingress node 105 coupled with a first device (e.g., a source device or call initiating device) 102, an egress node 110 coupled with a second device (e.g., a destination device or a called device) 112, and a connection 115. This connection 115 may be part of a circuit-switched network or a connection-oriented packet-switched network, and may be formed by at least one intermediate node, or by a link between the nodes 105 and 110.

Figure 2:
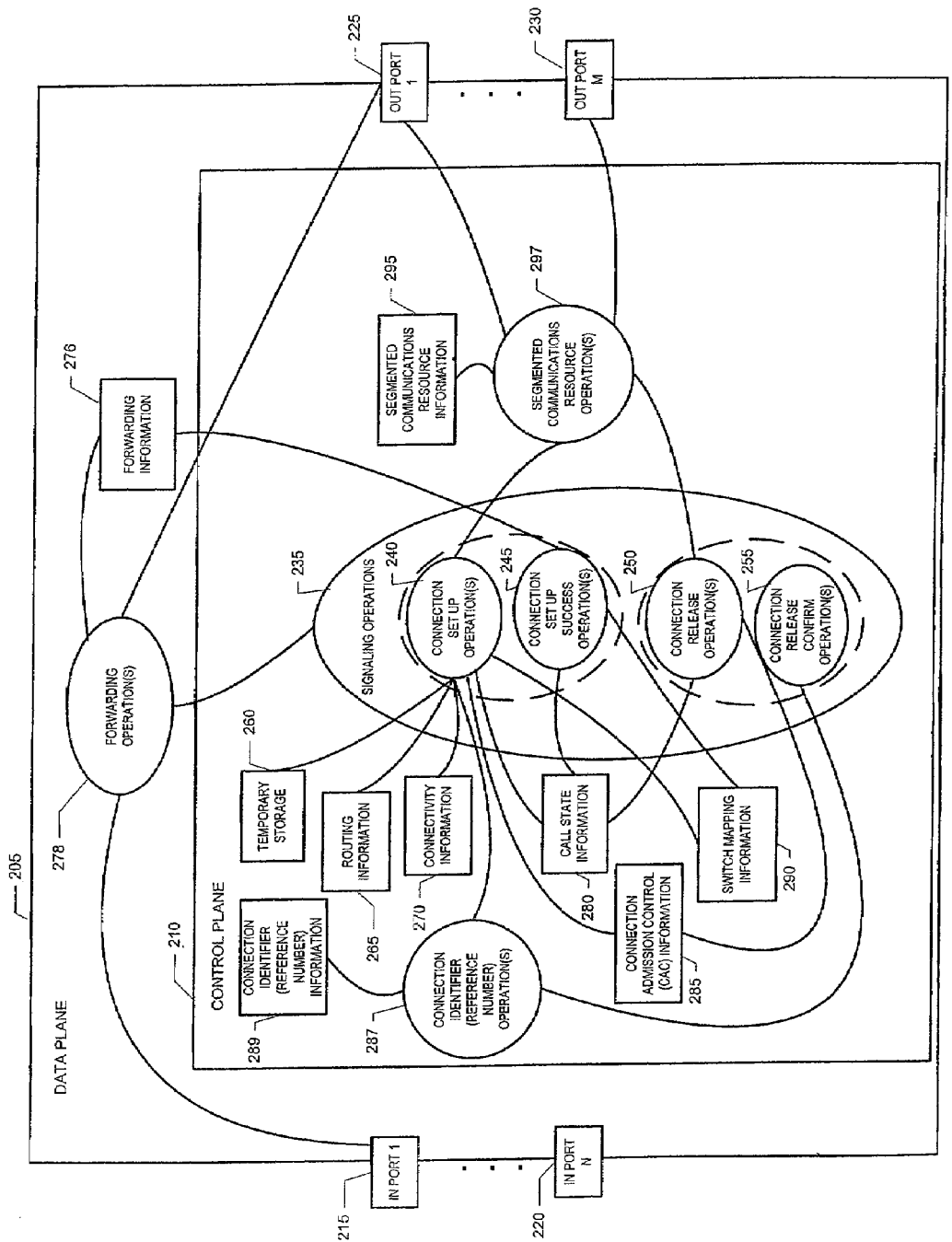
FIG. 2 illustrates an exemplary node of the present invention.

FIG. 2 is an exemplary node, e.g., a label-switching router (LSR) 200 in which the present invention may be used. The router 200 may include a logical data plane 205 and a logical control plane 210. The data plane includes forwarding operation(s) 278, forwarding information 276, IN ports 215, 220 and OUT ports 225, 230. These ports may serve to terminate communications links (not shown). The forwarding operation(s) 278 may forward data received on the IN ports 215, 220. Based on the forwarding information 276, which may include IN ports, IN labels, OUT ports and OUT labels in a packet-switched network, destination information in the received data, or communications resource identifier in a circuit-switched network, the router 200 transmits the data through the appropriate OUT port 225, 230.

The control plane 210 may include routing information 265, temporary storage 260, connectivity information 270, call state information 280, connection admission control (CAC) information 285, switch mapping information 290, segmented communications resource (e.g., a multiplexed link such as a TDM link, a WDM link, etc.) operation(s) 297, segmented communications resource information 296, connection identification (e.g., reference number) operation(s) 287, connection identification (e.g., reference number) information 289 and signaling operations 235.

Routing information 265 is used by a signaling protocol to form a part of a connection. The routing information 265 includes information that may be used to determine through which port a particular destination can be reached. Temporary storage 260 may be used to store data for functions performed by signaling operations 235. Connectivity information 270 correlates a connection identifier from a directly upstream node in a connection to a corresponding connection identifier in a present node. State information 280 includes information about the state of a connection. CAC information 285 is referenced to determine available bandwidth on a link that can be used as a part of a connection to a given destination address. Switch mapping information 290 is used to program the forwarding information 276 of the data plane. Switch mapping information 290 may be used to correlate incoming and outgoing interface identifiers and communications resource identifiers, so that the forwarding operation(s) 278 can forward incoming data to corresponding OUT ports.

Segmented communications resource operation(s) 297 allocates the communication resources of the router 200. Communication resource availability is stored in segmented communications resource information 295. Connection identifier (e.g., reference number) operation(s) 287 assigns a local identifier (e.g., reference number) to each of the different connections being handled by the router 200. Reference number availability information is stored in connection identifier (e.g., reference number information 289.

Signaling operations 235 include connection set up operation(s) 240, connection set up success operation(s) 245, connection release operation(s) 250 and connection release confirm operation(s) 255. The connection set up operation(s) 240 establishes a connection to the next node in path that leads to a destination. That is, it 240 finds a path from the present node to the next node and allocates the necessary bandwidth between the nodes. The next node executes the same operation 240, and so on, until the destination node is reached and the call is coupled to the called device. The connection set up success operation(s) 245 confirms the establishment (or failure) of a connection. The release operation(s) 250 and the release confirm operation(s) 255, are used to release any allocated bandwidth once a connection is torn down. These operation(s) 250, 255 are also used in the event of an error in connection set up operation. Further interactions between these operations as it pertains to the present invention will be described below.

Figure 3:
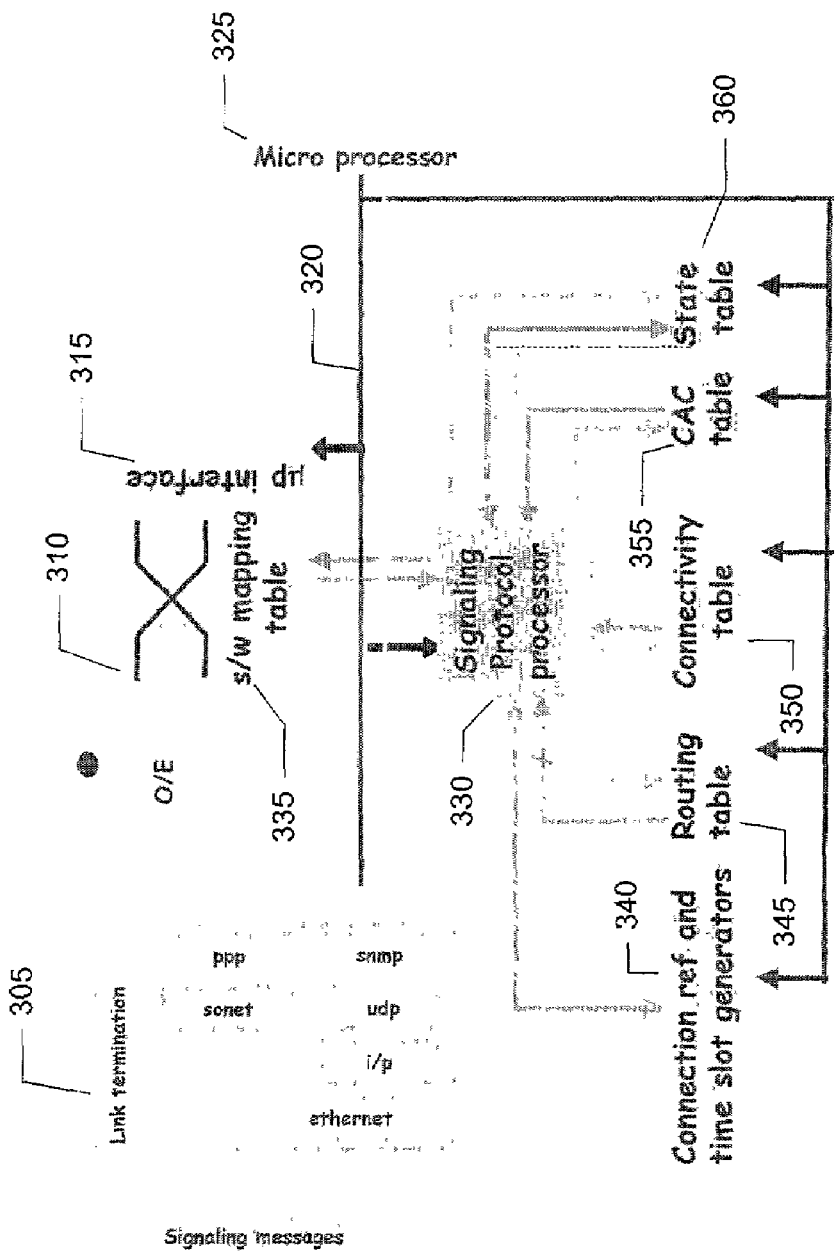
FIG. 3 illustrates an exemplary switch fabric that may be managed by the present invention.

More specifically, the signaling operation 235 may be effected by a signaling protocol processing engine may be part of a switch fabric board. An exemplary switch fabric board 300 is shown in FIG. 3. The switch fabric board 300 includes de-multiplexers 305, a space switch 310 and multiplexers 315. Signals on the incoming interfaces to the switch fabric are de-multiplexed to the space switch's cross connect rate. The input and output ports to the space switch 310 are uniquely identified by the (interface number, time-slot number) pair. Signals on the output ports of the space switch 310 are multiplexed (e.g., up) to the (e.g., higher) rate of the output interfaces of the switch fabric for transmission to the next node. An example switch fabric is the SONET/SDH TADM device from Lucent Technologies, Inc. that supports 155, 622, and 2488 Mbits/s SONET/SDH interfaces with a cross-connect rate of STS-1 granularity between receive ports. It supports STS48/STM-16, quad STD-12/STM-4 and quad STS-3/STM-1 interface rates.

Switch fabric board 300 may have a generic microprocessor interface 325. The switch fabric board 300 can be configured through the local data bus 320, either by the microprocessor 325, or by the signaling protocol processor 330. The signaling protocol processor 330 may process signaling protocol messages and dynamically configure the switch fabric 300 by writing to the switch mapping table 335, while the microprocessor 325 may perform traffic monitoring and network management by reading registers 340, 345, 350, 355, 360. Processing signaling messages entails maintaining the state information 360 associated with each connection in the switch fabric and mandates the use of memory in the design. External RAM to maintain the state information may be used. Less frequently used and/or more complicated operations such as routing, exception and error handling tasks may be implemented in software and carried out in the background concurrent with the signaling protocol processing. More frequently used and/or less complicated operations may be performed in hardware for providing faster call handling capacities. The signaling messages may be transported over network and data link layer protocols such as IP and Ethernet. Appropriate link termination boards may be used to strip these link or network layer protocol headers before sending the signaling message to the signaling hardware for processing.

§ 4.2 High-Level Functions, Messages and States of the Present Invention

Figures 4, 5, 6:
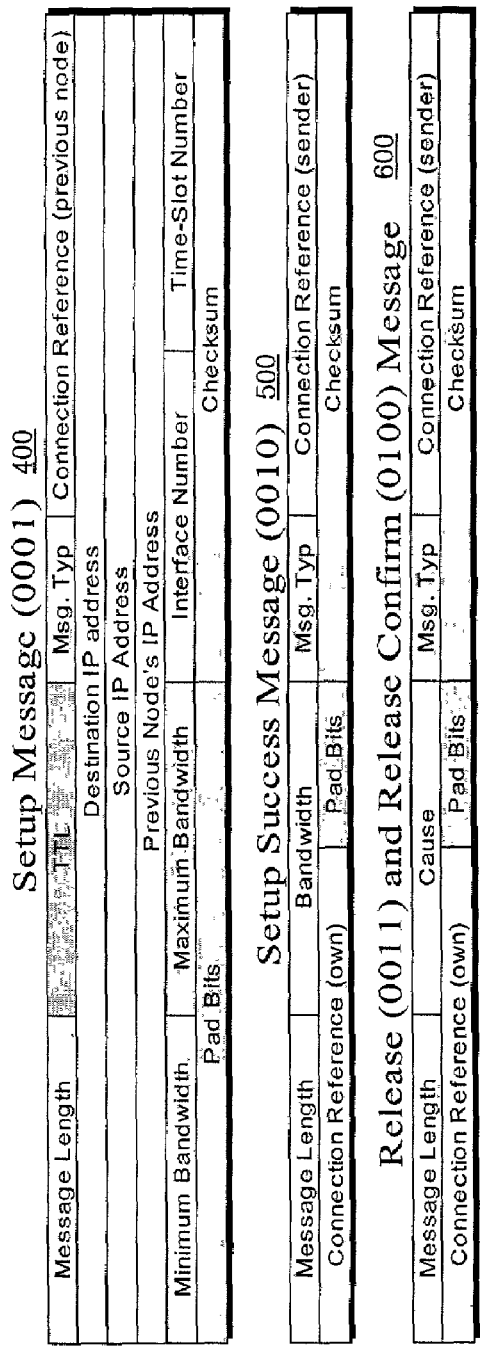
FIG. 4 illustrates an exemplary setup message that may be used by a call signaling method of the present invention.
FIG. 5 illustrates an exemplary setup success message that may be used by a call signaling method of the present invention.
FIG. 6 illustrates an exemplary release or release confirm message that may be used by a call signaling method of the present invention.

High-level functions that may be performed by the present invention include establishing a connection, tearing down a connection, allocating communication resources, and allocating connection identifiers (e.g., reference numbers). The Setup and Setup-Success messages may be used by the connection establishing function of the present invention to establish a new connection. An exemplary setup message 400 is shown in FIG. 4, and an exemplary setup success message 500 in shown in FIG. 5. Release and Release-confirm messages may be used by the connection tearing function of the invention to release a previously established connection. Exemplary Release and Release-confirm messages 600 are shown in FIG. 6.

The setup message 400 includes information that is used to create a connection for a device coupled to an ingress node. It is an exemplary embodiment used in a TDM network. The exemplary setup message 400 includes a field identifying the message length, the time to live (TTL), the message type, the connection reference of the previous node, the destination IP address, the source IP address, the previous node's IP address, the minimum requested bandwidth, the maximum requested bandwidth, the interface number, a segmented communications resource identifier (e.g., a timeslot number), pad bits and a checksum.

The fields of the exemplary setup success message 500 include the message length, the bandwidth allocated, the message type, the connection reference number of the sender, the connection reference number of the current node, pad bits, and a checksum.

The fields of the exemplary release and release confirm messages 600 include the message length, the cause of the release, the message type, the connection reference number of the sender, the connection reference number of the current node, pad bits, and a checksum.

Figure 7:
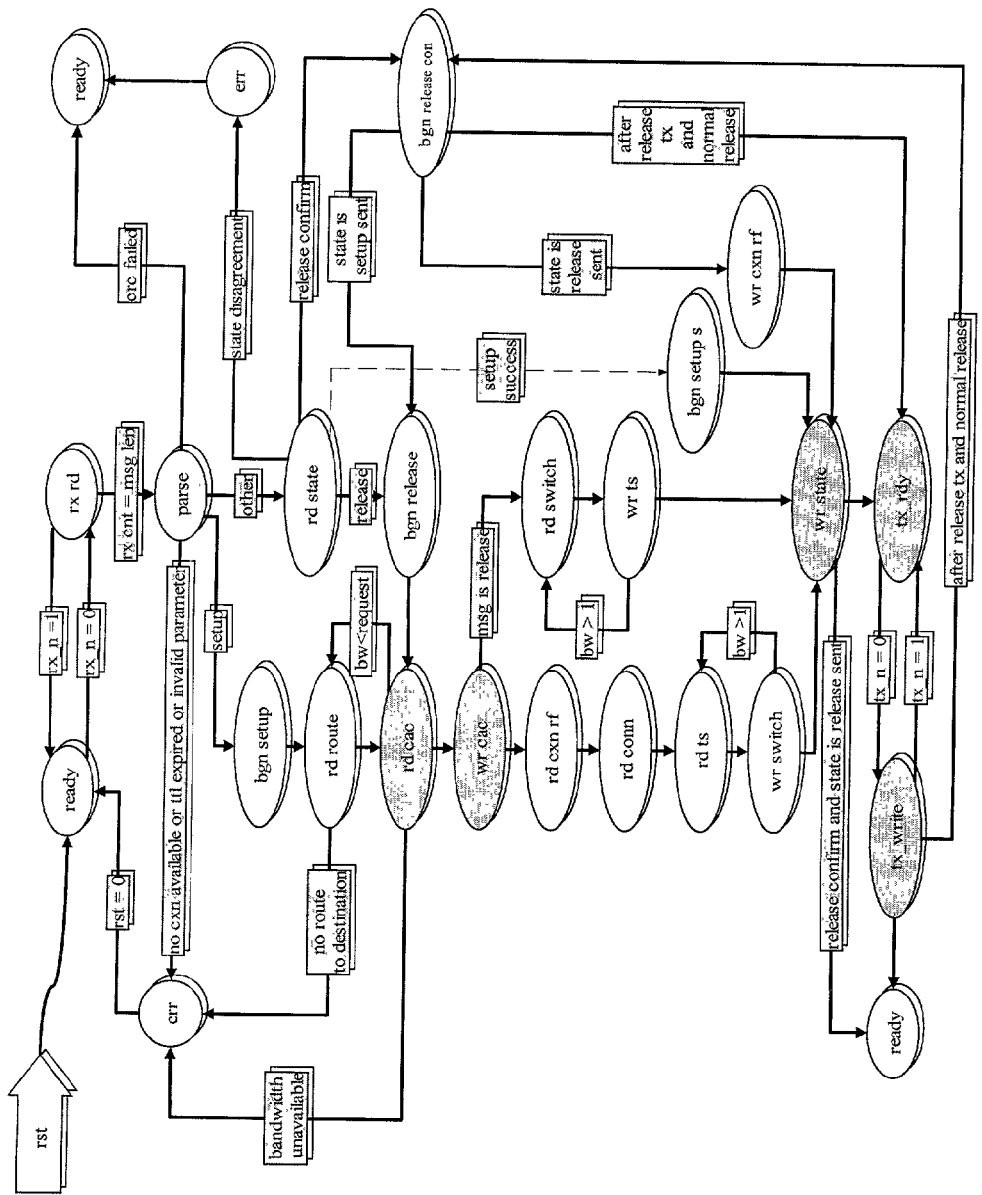
FIG. 7 is a state machine illustrating exemplary setup and release functions that may be used by a call signaling method of the present invention.

The state machine 700 shown in FIG. 7 illustrates a high level diagram describing the steps of the setup and release functions perform by the invention. The state machine reflects core functions that may be performed by an exemplary signaling protocol: memory reads and writes. For simplicity, those states during which the protocol either waits for memory or writes data to the outgoing messages registers are not shown in the state machine.

Figure 8:
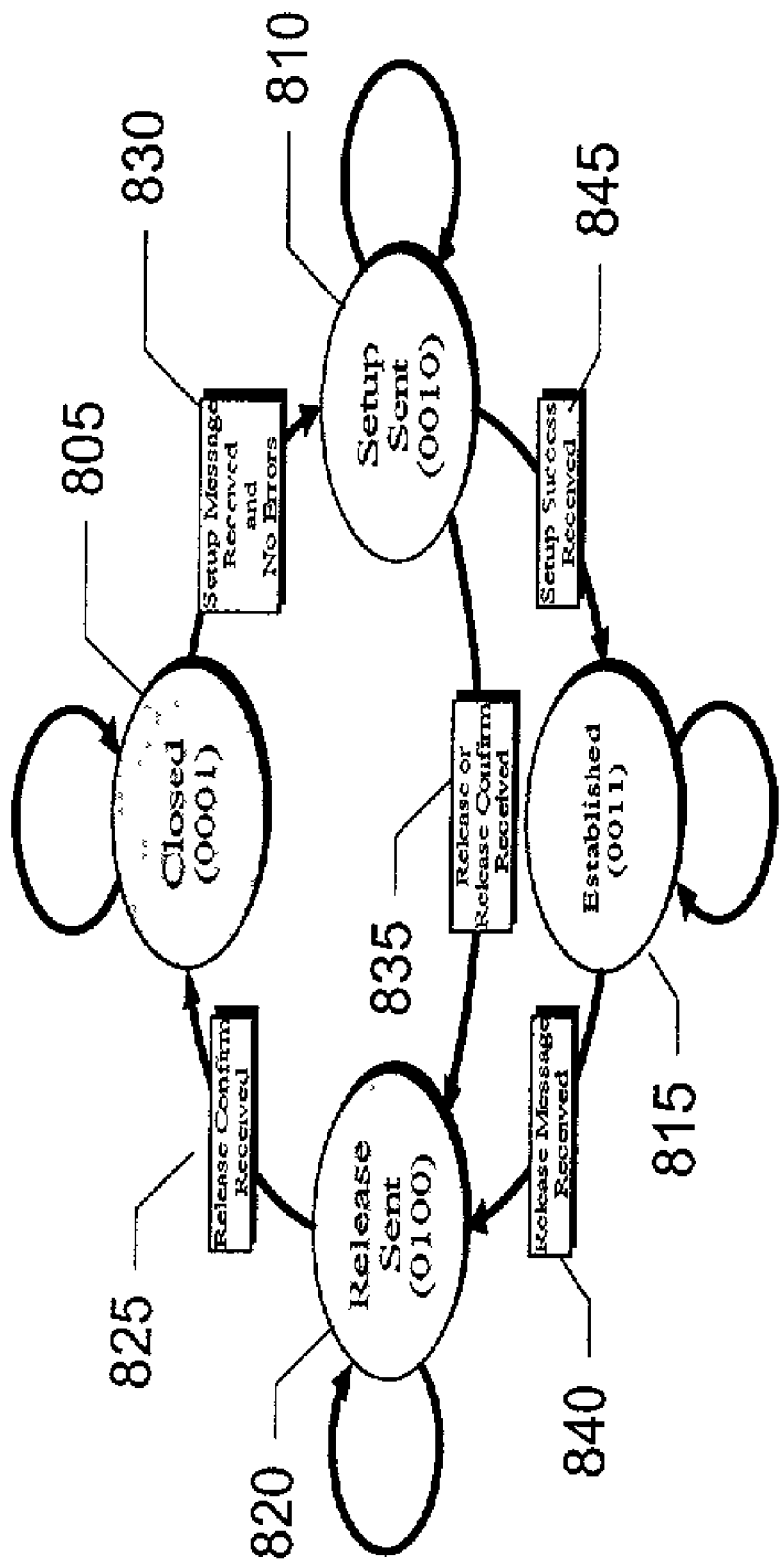
FIG. 8 is a state diagram illustrating the different states of a connection.

A connection may be in one of four states. FIG. 8 is a state diagram illustrating these four different states, and the messages that change the state of the connection. These four states are closed 805, setup sent 810, established 815, and release sent 820.

When a connection does not exists it is in the closed state 805. While setup messages are being transmitted 830 to couple a source device and a destination device, the connection is in the setup sent state 810. If an error occurs and a release or release confirm message is received 835, the connection goes to a release sent state 820. If a setup success message is received 845, the connection is in an established state 815. Once a release message is received 840, the connection goes to a release sent state. Finally, when a release confirm is received 825, the connection returns to a closed state 805.

The states of the nodes that make up the connection include a normal state, when no errors are occurring and the signaling protocols is functioning in a normal manner, and an error state, when an error occurs during an operation of a signaling protocol.

With reference to the exemplary embodiment of FIG. 3, a set up function of the invention is now described. Setting up a new connection includes Setup message and Setup-Success message processing. Setup message processing begins with finding the address, from the routing table 345, of a next link (on the connection to the destination at the requested data rate) and an outgoing interface terminating that link. This information is used as an index into the connection admission control (CAC) table 355 to determine if the bandwidth available on the interface can support the call. These connection admission control steps (rd_route→rd_CAC in the state machine) are repeated until an outgoing interface on a path to the destination device with sufficient bandwidth is found. Once an outgoing interface with sufficient bandwidth is found, the available bandwidth associated with that interface is updated in the CAC table 355 (wr cac state) to reflect admission of the call and a locally generated connection identifier (e.g., reference number) is associated with this connection (rd cxn rf state). On the other hand, if an interface with a sufficient bandwidth is not found, an error code is set and the machine transitions into the error state.

Following connection admission control, a set up message is generated as follows and sent to the next node. While most of the entries in the incoming setup message are directly copied into the outgoing message, only the connection reference and IP address entries associated with the node receiving this message are modified. The address of the next node, outgoing interface number to which it is connected, connection identifier (e.g., reference number) of the message sender and the maximum bandwidth are stored in a scratch register. The requested bandwidth is allocated on the outgoing interface by allocating as many time-slots as are necessary (one at a time) and the switch is programmed by writing the outgoing interface/time-slot pairs into the switch mapping table 335 (rd ts→wr switch). These pairs are also written into the outgoing message. The state information is saved into the state table 360 using the connection reference number as the index with the state of the connection set to setup sent. Finally, the outgoing message is transmitted.

Processing the setup-success message 500 begins with indexing into the state table 360 using the connection reference number in the message. Then the state of the connection is changed from setup sent to established. At the same time, the setup success message is updated using the connection identifier (e.g., reference number) from the state table and sent. If, on the other hand, the state of the state table entry is not setup sent, an error code is set and the machine transitions into the error state. The release and release confirm messages are similarly processed as shown in the state machine and will be discussed below.

The segmented communications resource (e.g., a time-slot on a TDM link, a wavelength on a WDM link, etc.) allocating function of the invention allocates the bandwidth of the switch fabric to the connections that use the router. For example in a TDM network time-slots are allocated and in a WDM network, wavelengths are allocated. When a connection is set up at a router, the router identifies the connection by giving it an identifier (e.g., a reference number). Therefore, the present invention includes a connection identifier (e.g., reference number) allocating function.

§ 4.3 Exemplary Data Structures, Methods and Apparatus

Exemplary methods and data structures for effecting the functions summarized in § 4.2 are described in this section. More specifically, § 4.3.1 describes exemplary data structures, § 4.3.2 describes exemplary connection setup operations, § 4.3.3 describes an exemplary connection setup success operations, § 4.3.4 describes exemplary connection release operations, § 4.3.5 describes exemplary connection release confirm operations, § 4.3.6 describes exemplary segmented communication resource operations and § 4.3.7 describes exemplary connection identifier (e.g., reference number) operations. Then, exemplary apparatus that may be used to effect the functions summarized in § 4.2 are described in § 4.3.8.

§ 4.3.1 Exemplary Data Structures

One embodiment of the signaling protocol of the present invention maintains and/or uses five data structures. These data structures include, a switch mapping table, a state table, a connectivity table, a routing table, and a CAC table. Exemplary data tables are shown in FIGS. 9, 10, 11, 12, and 13, respectively. The exemplary switch-mapping table 900 is used to configure the input-output paths of the switch. Configuring a switch may be effected by modifying the contents of this table. The state of each active connection is maintained in the state table 1000. The connectivity table 1100, the routing table 1200 and the CAC table 1300 maintain information used to allocate resources and determines next links of connections.

The exemplary switch-mapping table 900 includes information used to program the switch once the connection has been established. The table 900 maps incoming channel identifiers (e.g., time-slot/interface pairs) to outgoing channel identifiers (e.g., time-slot/interface pairs). The index into the exemplary switch-mapping table 900 may be 20-bits wide and may be obtained by concatenating the 12-bit connection identifier (e.g., reference number) chosen during call setup with an 8-bit offset associated with an amount of bandwidth allocated for the connection. For example, an OC12 connection through a switch with an OC-1 cross connect rate will have 12 entries in the switch mapping table.

The state table 1000 tracks active connections through a switch. The connection reference number in the table is used to index entries in the state table 1000 at a switch. The state table 1000 maintains the state of the connection, the bandwidth allocated for the connection, and the connection reference numbers and IP addresses of the adjacent upstream (previous) and the adjacent downstream (next) node. As mentioned above, a connection can be in one of many states. The state information about a connection is used to determine the messages that are created and sent in response to receiving a setup success message. In addition, the state table 1000 maintains a pointer into the corresponding entry in the switch-mapping table 900. Overall, each state table entry is, e.g., 112-bits wide.

The interface numbers delivered in a setup message (Recall, e.g., 400.) specify outgoing interfaces on the previous switch, but the incoming interface numbers are necessary for programming the local switch. For this purpose, each switch has a connectivity table 1100 that maps the outgoing interfaces of the upstream (previous) switch into the incoming interfaces of the local switch. In one embodiment it may be assumed that one outgoing interface on the upstream (previous) switch is connected to one incoming interface of the current switch. In other embodiments, each connection may be associated with multiple interfaces. The index to entries in the connectivity table 1100 is, e.g., 40-bits wide, and is obtained by appending the 8-bit interface number received in the setup message to the end of the 32-bit IP address of the node that sent the message. Information contained in the connectivity table is assembled by the host system and may not be modified by the signaling protocol.

Calls are routed based on destination IP addresses contained in setup messages and the bandwidth requested by the call. Optional next-hop addresses (or alternatively, outgoing links and ports) are maintained for each destination in the routing table 1200. If a first of the optional addresses is associated with a link that does not have sufficient bandwidth to support the call, then the next optional address is tried. The routing table 1200 returns a 32-bit IP address to the next-hop node that can support a connection to the destination address. Once again, the entries of the routing table are maintained by the host system. With a 42-bit address, the routing table 1200 has the largest address space of any table at the node. The next node address is written into the state table 1000 after the routing table lookup.

Connection admission is determined by the availability of bandwidth on a particular interface. The connection admission control (CAC) table 1300 holds the interface number, total bandwidth and the available bandwidth associated with the next-hop. Separating the CAC table 1300 from the routing table 1200 simplifies updating the bandwidth information.

Figure 14:
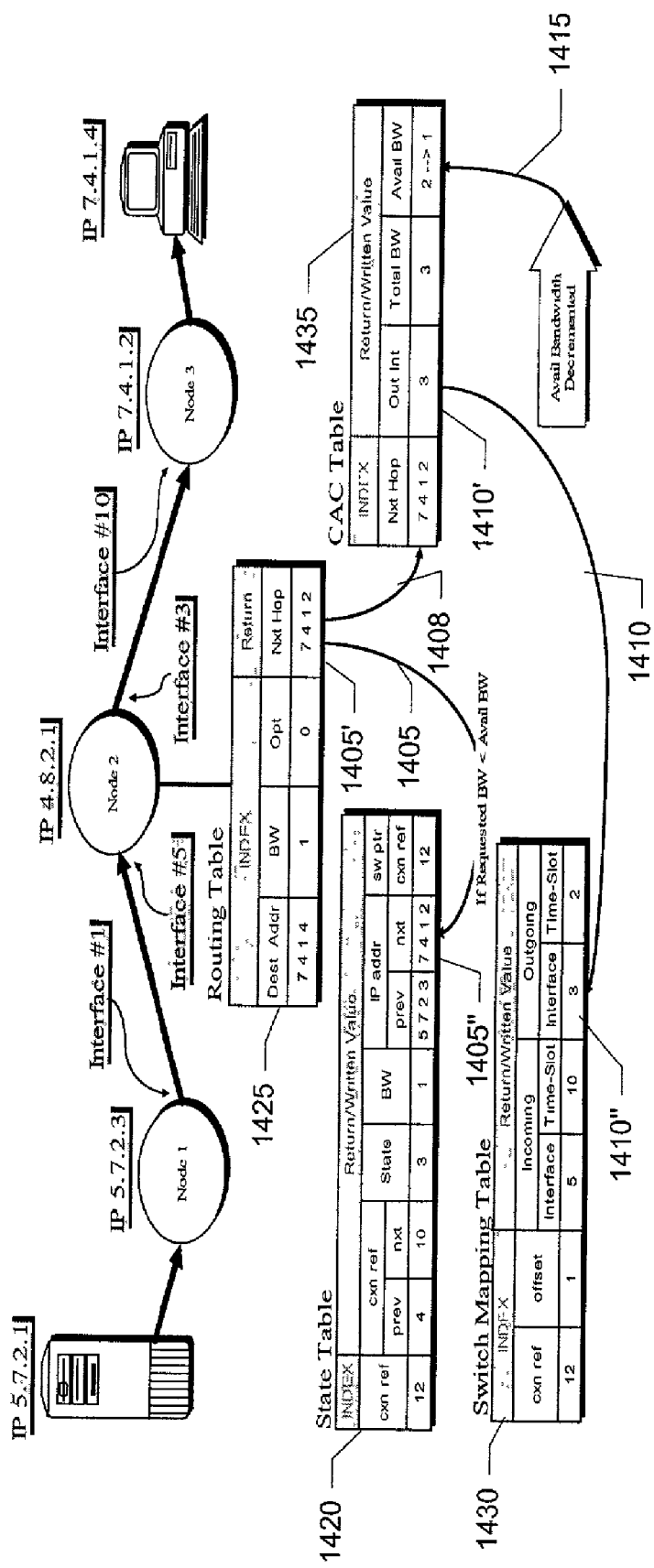
FIG. 14 illustrates the relationship between several exemplary tables.

The relationships between some of the tables used by the protocol are shown in FIG. 14. Arrow 1405 shows how the next hop IP address field 1405" of the state table 1420 is populated by the next hop field 1405' of the routing table 1425. Arrow 1408 represents the information in the next hop address field 1405' also being used to index the CAC table 1435. From the CAC table 1435 an OUT interface 1410' is determined and, as represented by arrow 1415, bandwidth is reserved by decrementing the available bandwidth for that particular IP address. Arrow 1410 represents the outgoing interface field 1410" of the switch mapping table 1430 being populated by the out interface information 1410' in the CAC table 1435.

§ 4.3.2 Exemplary Connection Setup Operations

Figure 15:
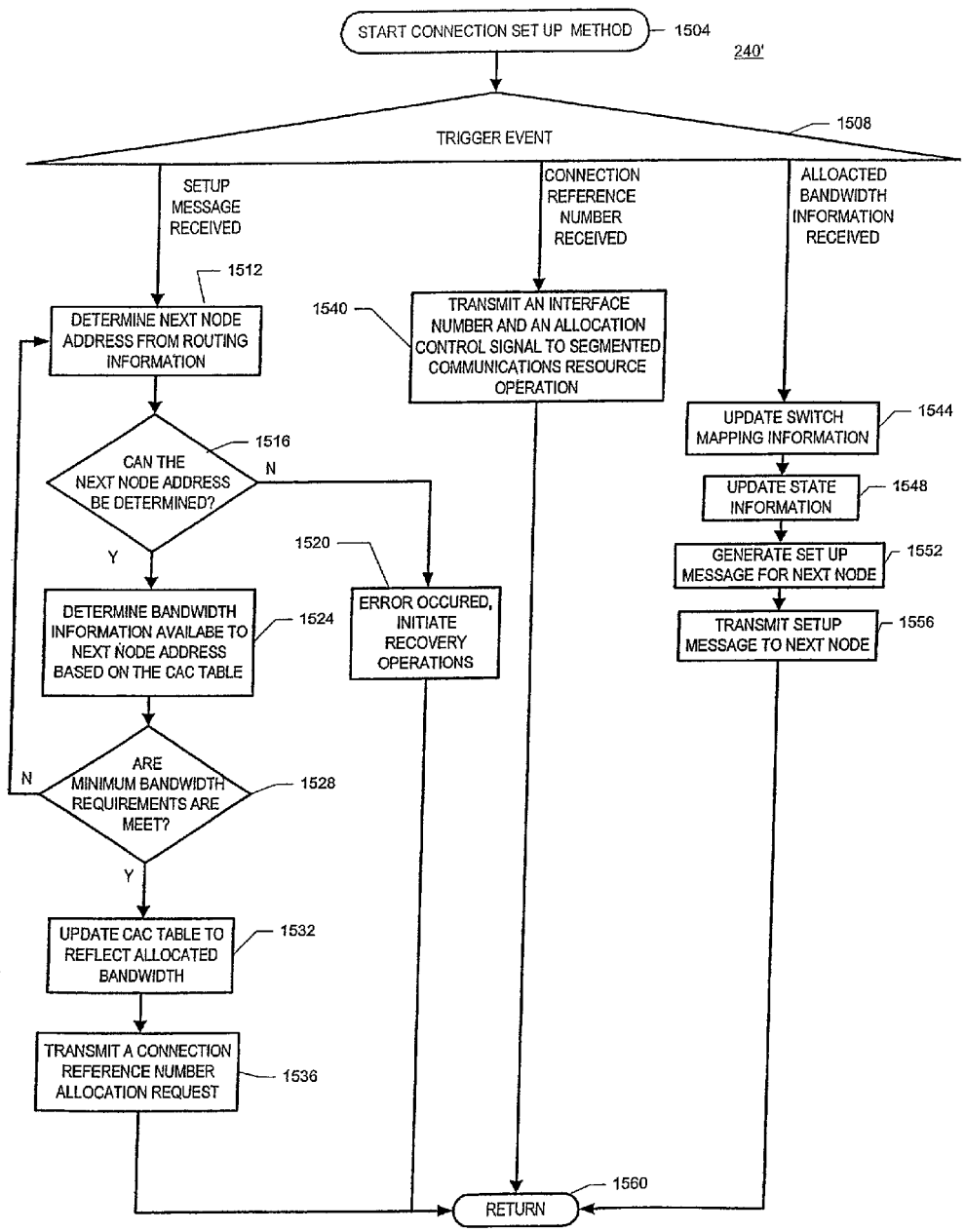
FIG. 15 is a flow diagram of an exemplary connection setup method.

FIG. 15 is a flow diagram of an exemplary method 240' that may be used to effect various connection setup operations 240. The exemplary connection setup method 240' of FIG. 15 starts at block 1504. In trigger event block 1508 one of three events may occur. First, if a setup message is received from an upstream (previous) node. Then the method 240' proceeds to block 1512, where routing information 265 is used to determine the next node in the potential connection.

Then the method 240' proceeds to decision block 1516. If the routing information 265 includes an appropriate next node address, the method 2401 proceeds to block 1524, but if the routing information does not include an appropriate next node address, the method proceeds to block 1520. In block 1520, an error occurrence is indicated and recovery operations are initiated. Due to the complexity of at least some recovery operations, some recovery operations are performed in software, and may include executing a routing program to determine the next node address for the connection. Then the method 240' is left via return node 1560.

Referring back to decision block 1516, assuming a suitable next node address is determined, method 240' proceeds to block 1524, where the amount of bandwidth available for the next node address is determined using the CAC table 285. Then the method 240' proceeds to decision block 1528 where it is determined whether or not the available bandwidth for the next node address satisfies the requirements of the connection. If the bandwidth requirements of the connection cannot be met, the method 240' returns to step 1512, where another next node address is determined. Referring, again to block 1528, when if a next node address with the required bandwidth is found, the method 240' proceeds to block 1532.

At block 1532, the CAC table 285 is updated to reflect bandwidth allocated to the connection. (e.g., to decrease the capacity of the link). Then the method 240' proceeds to block 1536, where a connection identifier (reference number) allocation request is transmitted. Then method 240' proceeds to return node 1560 where it waits for a connection identifier (reference number).

The connection reference number operation(s) 287 receives the request and generates returns a connection identifier (reference number). Returning to trigger event block 1508, when a connection reference number is received by the connection setup method 240', processing proceeds to block 1540. At block 1540, an interface number and an allocation control signal are transmitted to the segmented communications resource operation 297. Then method 240' proceeds to return node 1560 where it waits for allocated bandwidth information from that operation 297.

Once again returning to trigger event block 1508, if allocated bandwidth information is received, the method 240' proceeds to block 1544, where the connection identifier, bandwidth allocation, incoming channel identifier, and outgoing channel identifier fields of the switch mapping information 290 are updated with the acquired information. In block 1548 the local connection identifier, upstream connection identifier, state, upstream node address, down stream node address and a pointer to switch mapping table fields of the state information 280 are updated.

Then the method 420' proceeds to block 1552, where a setup message for the next node is generated. In block 1556, the generated set up message is transmitted through the forwarding operation 278 to the determined next node. If the present node is the destination node, the blocks 1552 and 1556 are not performed. Then, the method 240' is left via return node 1560.

§ 4.3.3 Exemplary Connection Setup Success Operations

Figure 16:
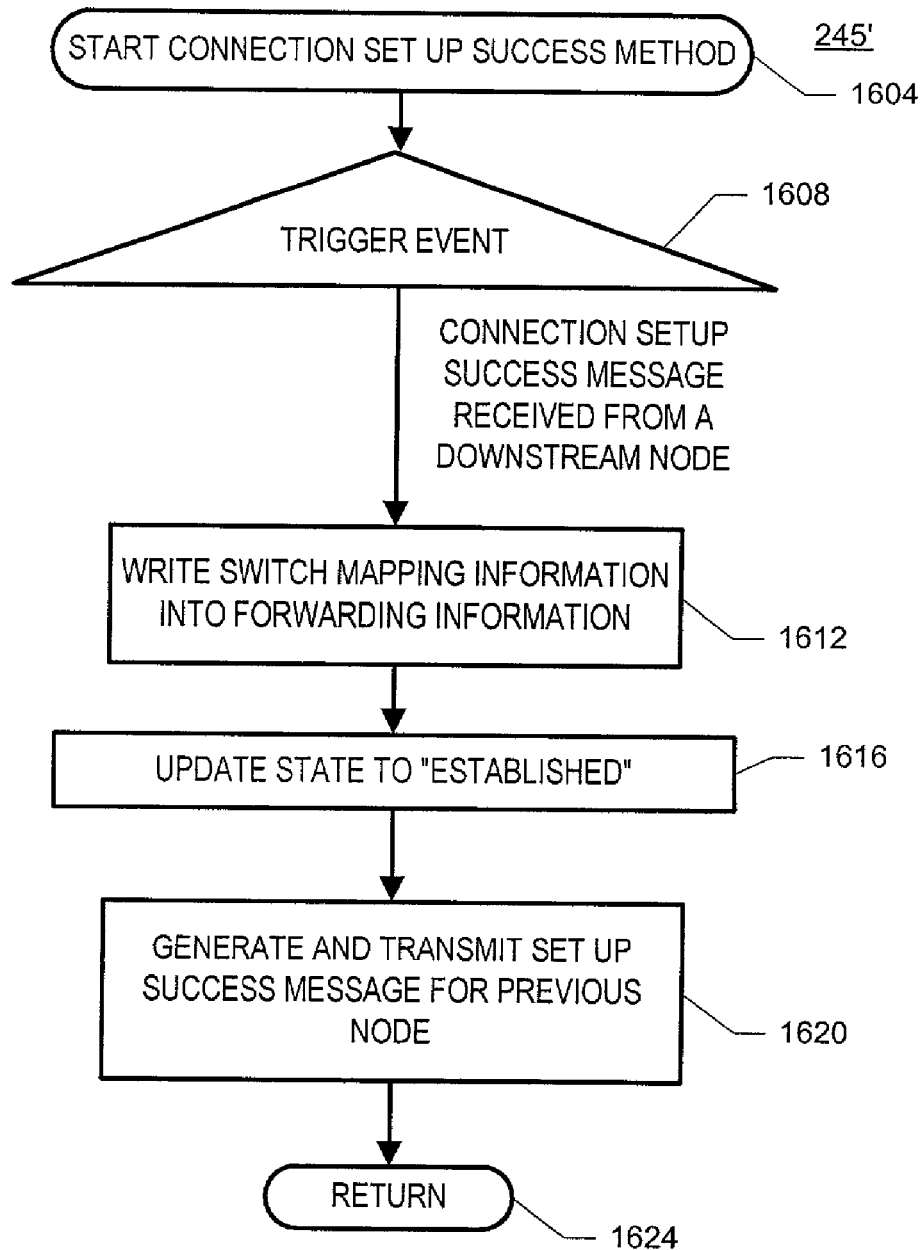
FIG. 16 is a flow diagram of an exemplary connection setup success method.

FIG. 16 is a flow diagram of an exemplary method 245' that may be used to effect various connection setup success operations 245. The exemplary connection setup success method 245' of FIG. 16 starts at block 1604 and proceeds to trigger event block 1608. If the method 245' receives a connection setup success message from a downstream node in a potential connection, then the method 245' proceeds from block 1608 to block 1612. At block 1612 the switch mapping information 290, stored in the control plane of the present node, is written to the forwarding information 276 in the data plane of the node. Then, the method 245' proceeds to block 1616, where the state information 280 is updated to an "established" state.

Then the method 245' proceeds to block 1620 where a set up success message is generated and transmitted to a upstream (previous) node on the potential connection. If the node receiving the setup success message is the source node, block 1620 is not performed, and the potential connection becomes a connection. Then the method 245' is left via return node 1624.

A setup success operation 245 is started at the egress node of a connection. Setup success messages travel upstream through the connection, and when the ingress node receives a setup success message the connection is established and data may begin to transmit.

§ 4.3.4 Exemplary Connection Release Operations

Figure 17:
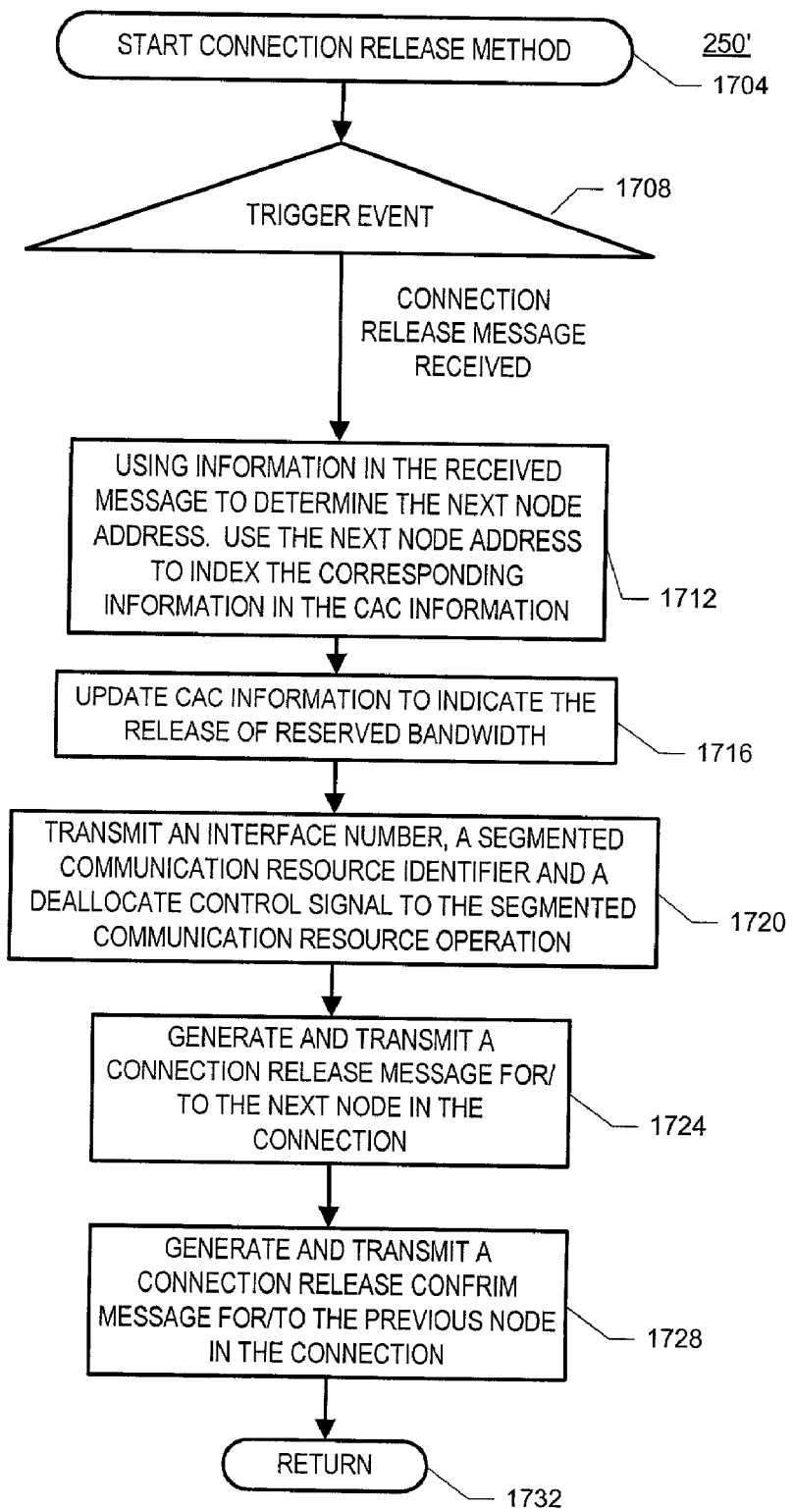
FIG. 17 is a flow diagram of an exemplary connection release method.

FIG. 17 is a flow diagram of an exemplary method 250' that may be used to effect various connection release operations 250. The exemplary connection release method 250' of FIG. 17 starts at block 1704. Then, the method 250' proceeds to trigger event block 1708. When a node that is part of a connection receives a connection release message, the method 250' proceeds to block 1712. In block 1712, using information (e.g., the connection reference number) received in the received connection release message and the state information 280, the next node address is determined. Using the next node address, the present node finds corresponding bandwidth information in the CAC information 285. Then the method 250', at block 1716, updates the CAC information 285 to indicate the release of bandwidth that was reserved by the connection being released.

From block 1716, the method 250' proceeds to block 1720, where an interface number, a segmented communications resource identifier and a deallocate control signal are sent to the segmented communications resource operation(s) 297. At the segmented communications resource operation(s) 297, the bandwidth reserved for the connection is released. Then, the method 250', proceeds to block 1724, where a connection release message for/to the next node in the connection is generated and transmitted. In block 1728, a connection release confirm message for/to the previous node, i.e., the node that sent the connection release message, in the connection is generated and transmitted. Then, the method 250' is left via return node 1732.

§ 4.3.5 Exemplary Connection Release Confirm Operations

Figure 18:
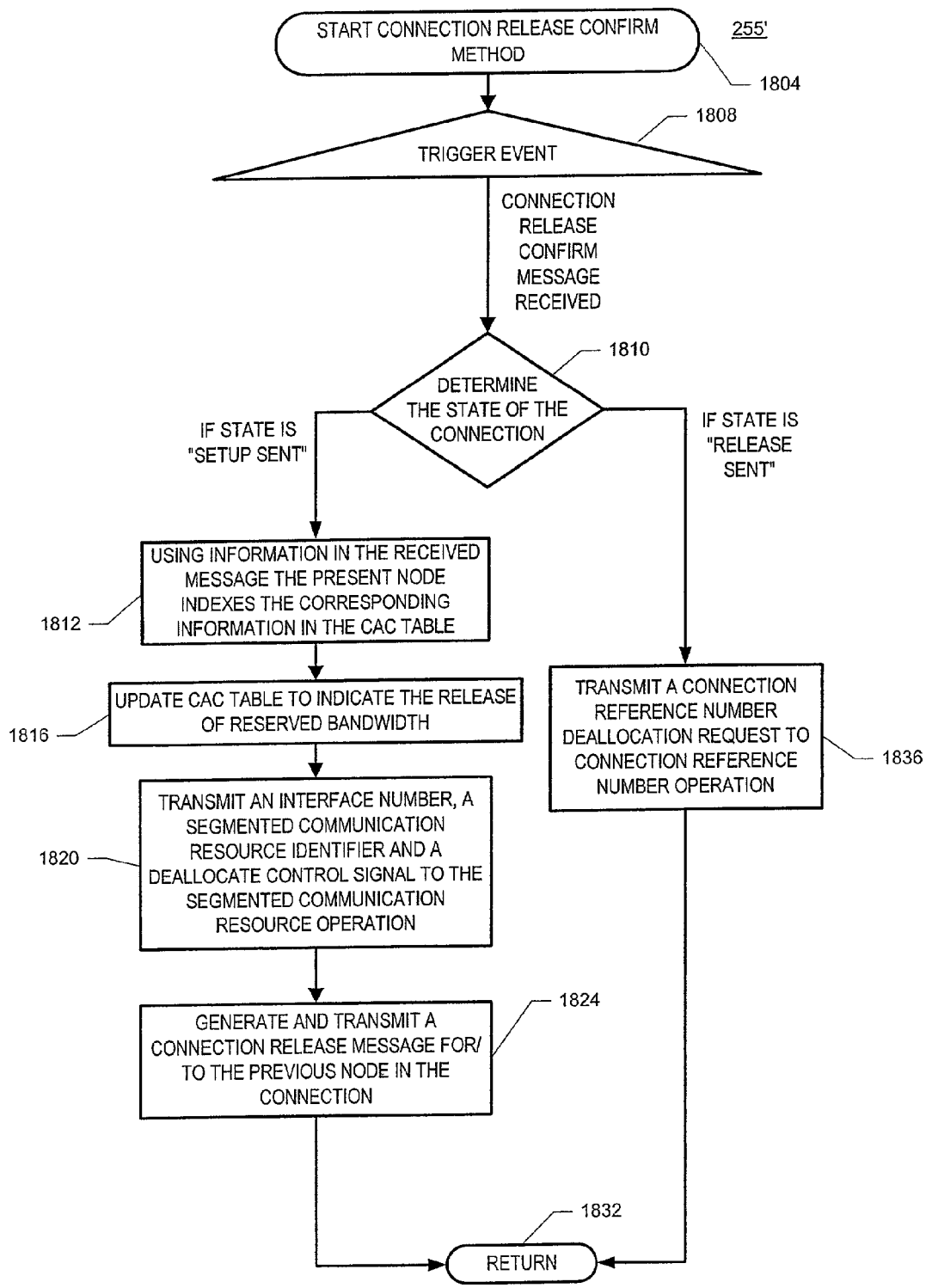
FIG. 18 is a flow diagram of an exemplary connection release confirm method.

FIG. 18 is a flow diagram of an exemplary method 255' that may be used to effect various connection release confirm operations 255. The exemplary connection release confirm method 255' of FIG. 18 starts at block 1804. At trigger event determination block 1808, a node that is part of a connection may receive a connection release confirm message. If this message is received, the method 255' proceeds to decision block 1810, where the state of the connection is determined.

If the connection is in a release sent state, the method 255' proceeds to block 1836. At this point the present node has already performed the connection release method 250', and any reserved bandwidth has already been released. At block 1836, the present node transmits a connection identifier (reference number) deallocation request to the connection identifier (reference number) operation 287. The connection identifier (reference number) operation 287 will set the provided connection reference number as available so it may be used by another connection. Then, the method 255' is left via return node 1832.

Referring again to decision block 1810, if the present node is in a setup sent state, the method 2551 proceeds to block 1812. This event occurs when a next node in a potential connection encounters an error (e.g., the next node cannot guarantee the requested bandwidth for the connection). If a next node encounters an error, it transmits a connection release confirm message to the sourcing node, which is in a setup sent state.

At block 1812, the present node proceeds to tear down the potential connection. It uses information received in the message (e.g., the connection identifier (reference number)) and the state information 280, to determine the next node address. Using the next node address the present node finds corresponding bandwidth information in the CAC information 285. Then the method 2551, at block 1816, updates the CAC information 285 to indicate the release of reserved bandwidth.

From block 1816, the method 2551 proceeds to block 1820, where an interface number, a segmented communications resource identifier and a deallocate control signal are transmitted to the segmented communications resource operation(s) 297. At the segmented communications resource operation(s) 297, the bandwidth reserved for the connection is released. Then, the method 255', proceeds to block 1824, where generation and transmission of a connection release message for/to the upstream (previous) node in the connection occurs. Then, the method 255' is left via return node 1832.

§ 4.3.6 Exemplary Segmented Communication Resource Operations

Figure 19:
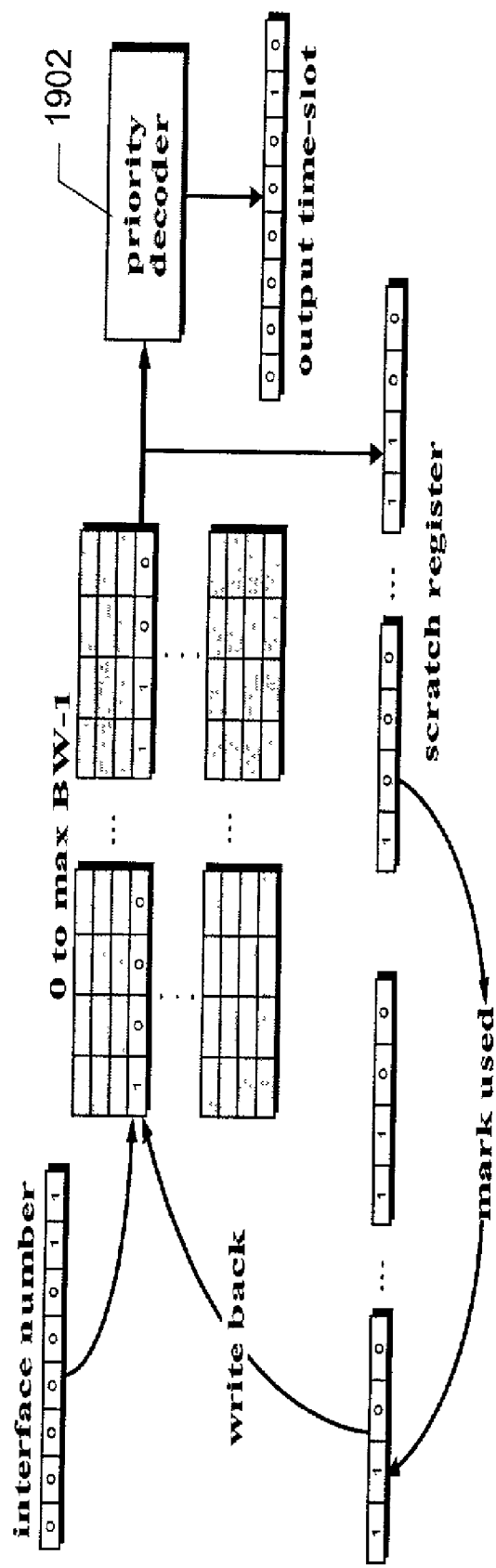
FIG. 19 illustrates an exemplary segmented communication resource table that may be used by the present invention.

The bandwidth of a connection and the cross connect rate of the switch fabric determine the total number of segmented communications resource segments (e.g., time-slots) that are assigned to the connection. A hardware-based implementation for managing the time-slots on a switch interface is described. Time-slot availability is stored at segmented communications resource information 295 (e.g., in a table). An exemplary time-slot table 1900 is shown in FIG. 19. The time-slot table 1900 at a switch has as many entries as there are interfaces (e.g., ports) on the switch. Each entry is a bit-vector with the bit-position determining the time-slot number and the bit-value determining availability ('0') or use ('1') of the time-slot. In one exemplary embodiment, table 1900, which may be stored in RAM, is implemented with an integrated priority decoder 1902. The priority decoder determines takes a bit vector as input and determines the next available time-slot in the bit vector. An 8-bit (outgoing) interface number is the index into the time-slot table 1900.

The exemplary time-slot table 1900 may return the next available time-slot on that interface as follows. When an interface number and allocate control signal are provided by the signaling state machine, the bit-vector associated with the interface number is sent into the priority decoder and the first available time-slot is returned as the next available time-slot. Then, the bit associated with the timeslot is marked as unavailable (i.e. changed from 0→1) and the updated bit-vector is written back to the table. Deallocating a timeslot follows a similar pattern. When an interface number, a time-slot and a deallocate control signal are provided to the timeslot table 1900, the corresponding bit-vector is obtained, the bit position associated with the time-slot is modified (i.e. changed from 1→0) and the updated bit-vector is written back. For a 256×256 switch fabric with an OC1 crossconnect supporting a maximum bandwidth of OC192 per interface, the time-slot table will have 256, 192-bit entries.

Figure 20:
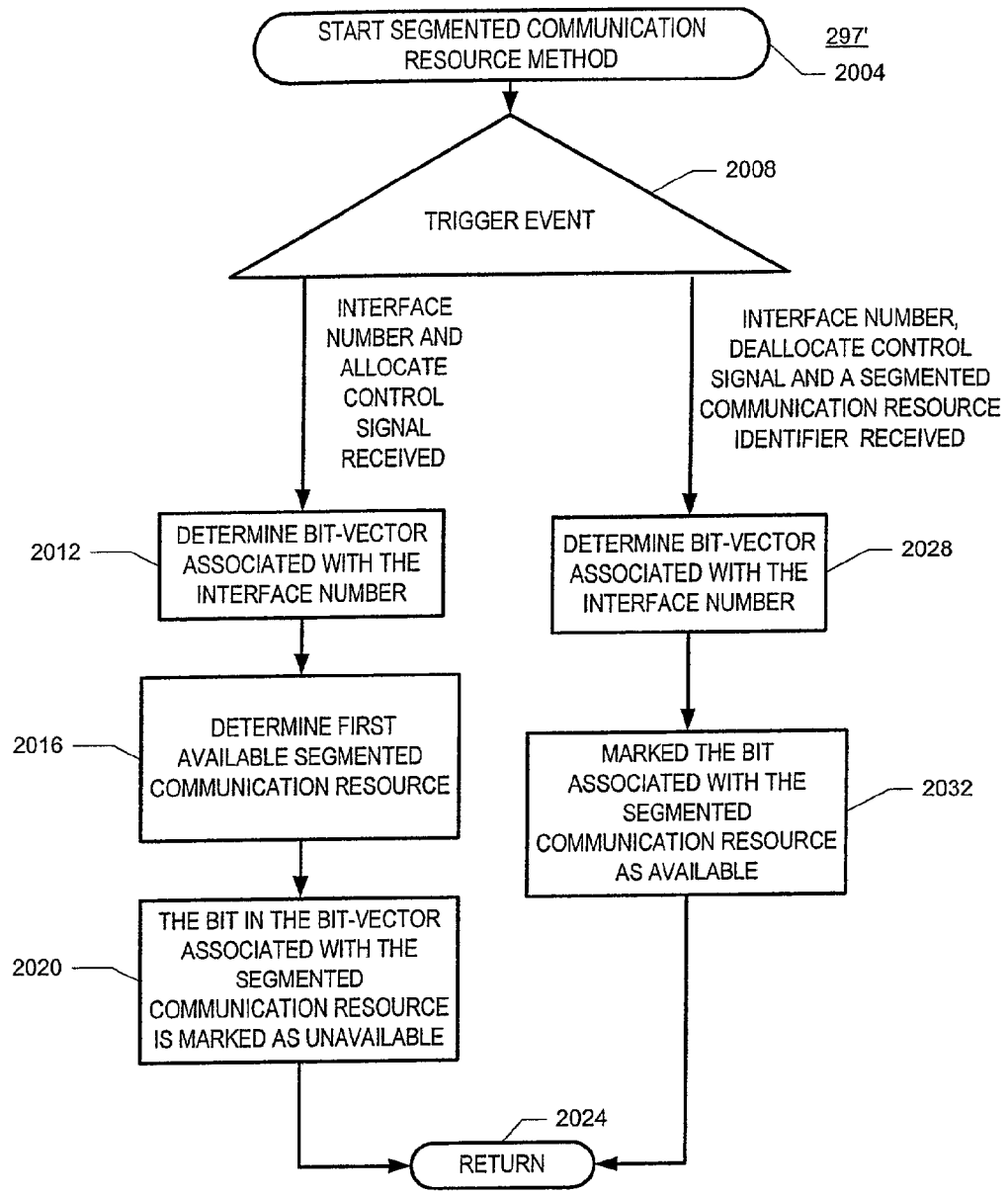
FIG. 20 is a flow diagram of an exemplary segmented communication resource method.

An exemplary segmented communications resource method 297' that may be used to effect segmented communications resource operation(s) 297 is illustrated in FIG. 20. The method 297' starts at block 2004. Then the method 297' proceeds to trigger event block 2008. If an interface (e.g., a port) number and a control signal is received and if the received control signal is an allocate control signal, the method 297' proceeds to block 2012, where a bit-vector associated with the interface number is determined. Referring to exemplary time-slot table 1900, the bit-vectors are the rows. The method 297' proceeds to block 2016, where the first available segmented communication resource is determined (e.g., using the priority decoder 1902). Then method 297' proceeds to block 2020, where the bit in the bit-vector associated with the segmented communications resource (e.g., time-slot) is marked as used (or unavailable). Then the method 297' is left via return block 2024.

Referring back to trigger event 2008, if a interface number, a deallocation control signal and a segmented communication resource identifier (e.g., a timeslot) is received, the method 297' proceeds to block 2028, where the bit vector associated with the received interface number is determined. Then the method 297' proceeds to block 2023, where the bit associated with the segmented communication resource is marked as available. Then the method 297' is left via return node 2024.

§ 4.3.7 Exemplary Connection Reference Number Operations

A connection reference number is allocated at connection setup and deallocated during connection release. An exemplary implementation of a connection reference number generator uses a 4096-bit vector combined with a priority decoder. The priority decoder finds the first available bit (a bit position marked '0'), sends its index as the connection reference and updates the bit position as used (bit is marked as '1'). A problem with this approach is that a connection reference that is freed may be immediately assigned to a new connection. This should be avoided because messages carrying connection references of those connections whose state is marked as closed will still circulate in the IP network for an unknown period of time. Thus, errors could result in message processing due to looped messages that cause faults in current data transmissions.

Another exemplary connection reference number method that may be used to effect connection reference number operation(s) 287, is a counter-based approach that generates an address into a 4096-entry table each entry of which is 1-bit wide. If the entry pointed to by the counter is available ('0'), then it is changed to busy ('1') and the counter value is taken as the connection reference number. This connection reference number method can operate concurrently with the state machine speeding up the time to generate a new connection reference number. The counter is incremented at each clock until an unused connection reference number is encountered. However, this approach is essentially a linear search through 4096 (connection references are 12-bits wide) entries in the table in the worst case.

Figure 21:
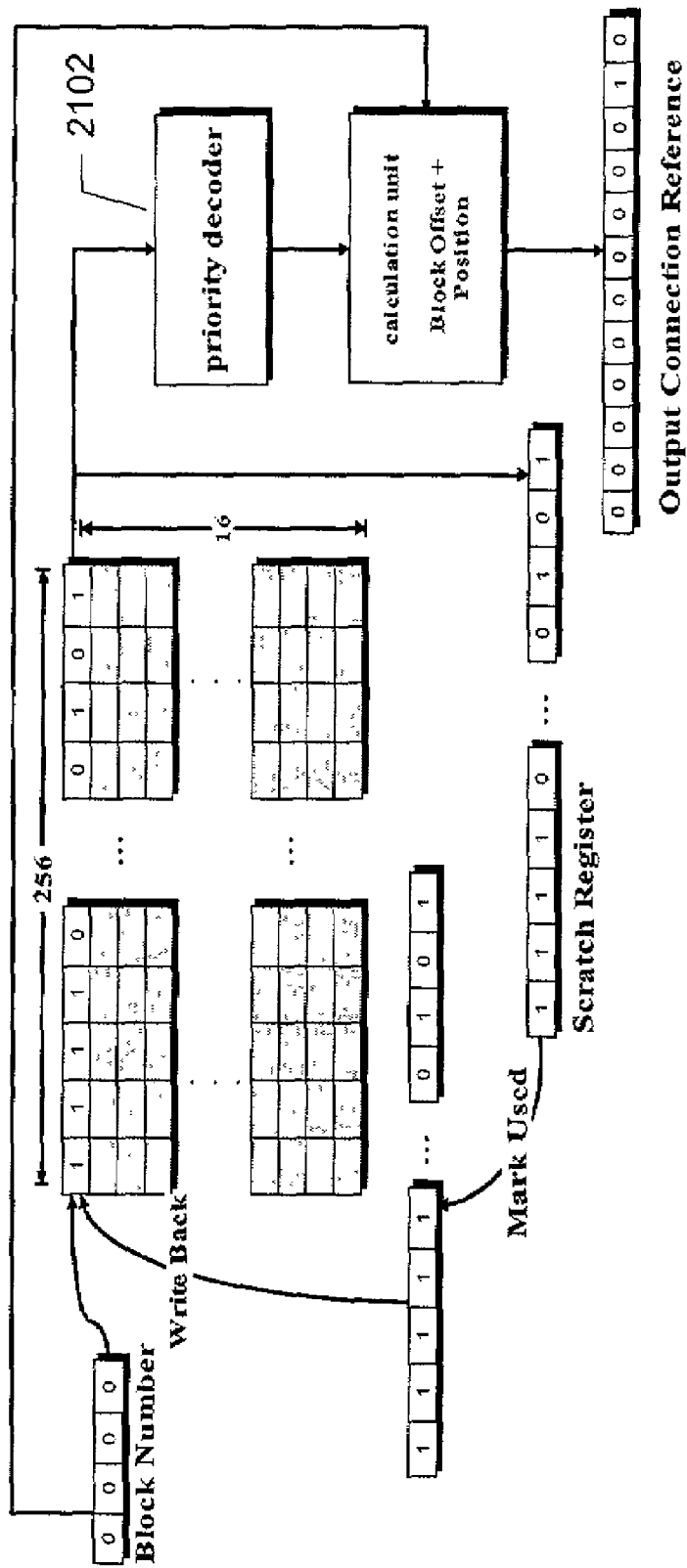
FIG. 21 illustrates an exemplary connection reference number table that may be used by the present invention.

Therefore, approaches in the previous methods may be combined and improved in a hardware implementation. Parallel processing may be utilized by partitioning the, e.g., 4096, element connection reference number table 2100 into 16, 256-element tables each with its own counter. An exemplary table 2100 is shown in FIG. 21. This parallel structure yields 16 parallel connection references. Any time one of these is used by the signaling state machine, the corresponding module is triggered to generate a new connection reference. The hardware implementation for each connection reference generator is identical except that each of them has a different connection reference offset added. When a connection reference is freed, the 4 leading bits are used to identify one of the 16 rows in the table and the remaining bits are used to identify the entry in the row. This table entry is then set to available (i.e. changed from 1→0). An additional counter tracks the total number of connection reference numbers available. When a connection reference number is allocated the available connection references count is decremented and when a connection reference is freed the available connection references count is incremented. An additional counter may be used so that the connection references are uniformly distributed across all 16 tables. Every time a connection reference is allocated, the table count is incremented.

Figure 22:
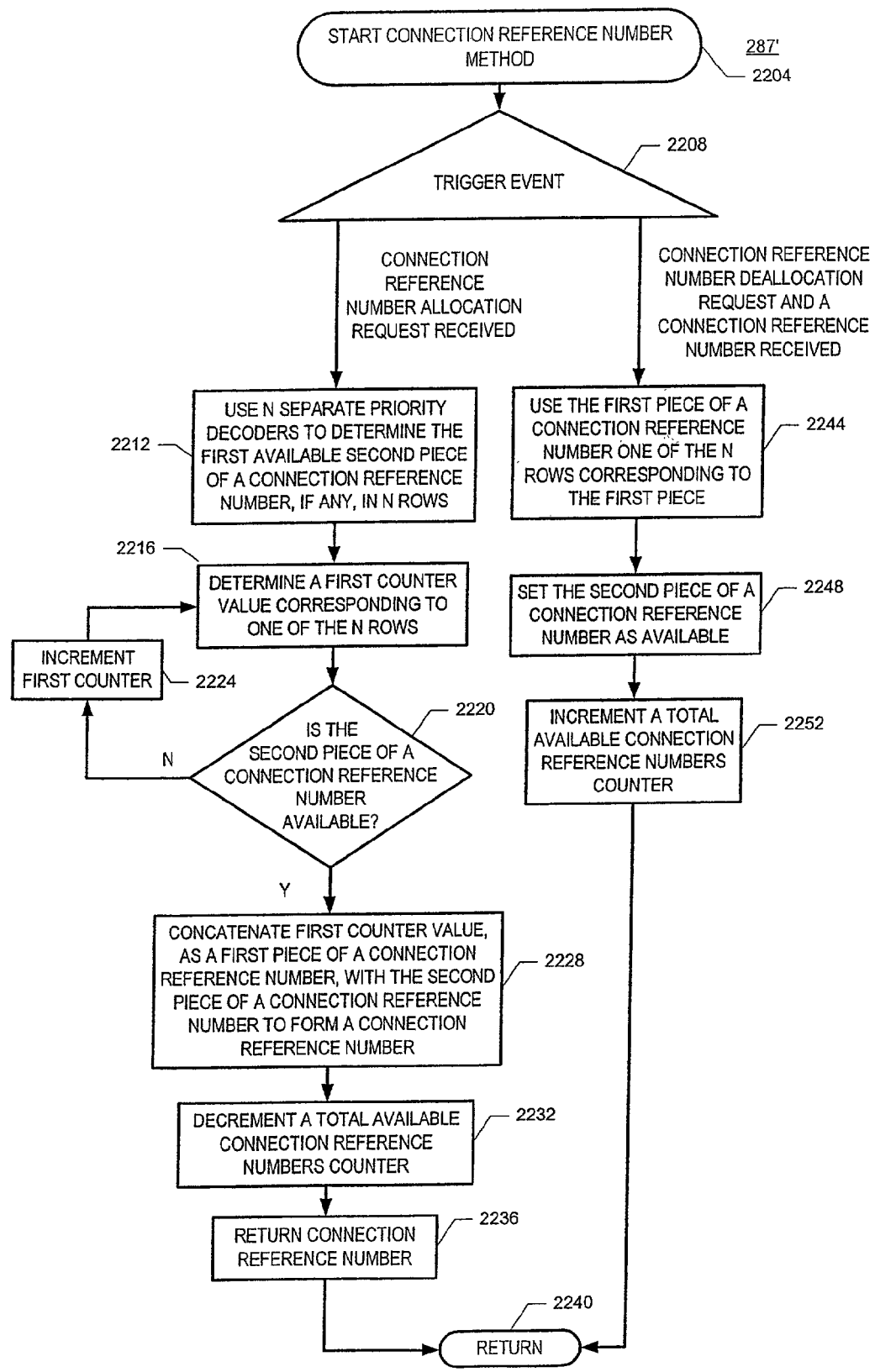
FIG. 22 is a flow diagram of an exemplary segmented connection reference number method.

An exemplary connection reference number method 287' that may be used to effect connection reference number operation(s) 287 is illustrated in FIG. 22. The method 287' starts in node 2204 and proceeds to trigger event 2208, where one of two event may occur.

If an allocation request is received, the method 2871 proceeds to block 2212. At block 2212, a number N, (e.g., 16), separate priority decoders 2102 are used to determine the first available second piece of a connection reference number, if any, in its respective row. Then the method 287' proceeds to block 2216, where a value from a first counter is determined. The values of the counter correspond to the N rows. Then the method 287' proceeds to decision block 2220. At decision block 2220, the method 287' determines if a second piece of a connection reference number, taken from the chosen row, is available. If a connection reference number is not available, the method 287' proceeds to block 2224, where the first counter is incremented. Then, the method 287' returns to block 2216 to determine a new row. Since each of the N rows were search in parallel, in the worst case scenario, this look up step is performed N times.

Returning to decision block 2220, if a second piece of a connection reference number is available in the chosen row, the method 287' proceeds to block 2228. At block 2228, the first counter value is used as a first piece of a connection reference number, and the first piece is concatenated with the second piece of a connection reference number to form a connection reference number.

The method 287' proceeds from block 2228 to block 2232 where the counter, which tracks the total available connection reference numbers, is decremented by one. Then, the method 287' proceeds to block 2236, where the connection reference number is returned to the connection setup operation 240 that sent the request. Then method 287' is left via return node 2240.

Returning to trigger event block 2208, if a deallocation request and a connection reference number is received, the method 287' proceeds to block 2244. At block 2244, the first piece of the connection reference number is used to locate the row in connection reference number table 2100. Then the method 287' proceeds to block 2248 where the second piece of the connection reference number is set as available in the table 2100. Finally, in block 2252, the counter, which tracks of total available connection reference numbers, is incremented. Then, the method 287' is left via return node 2240.

§ 4.3.8 Exemplary Apparatus

Figure 23:
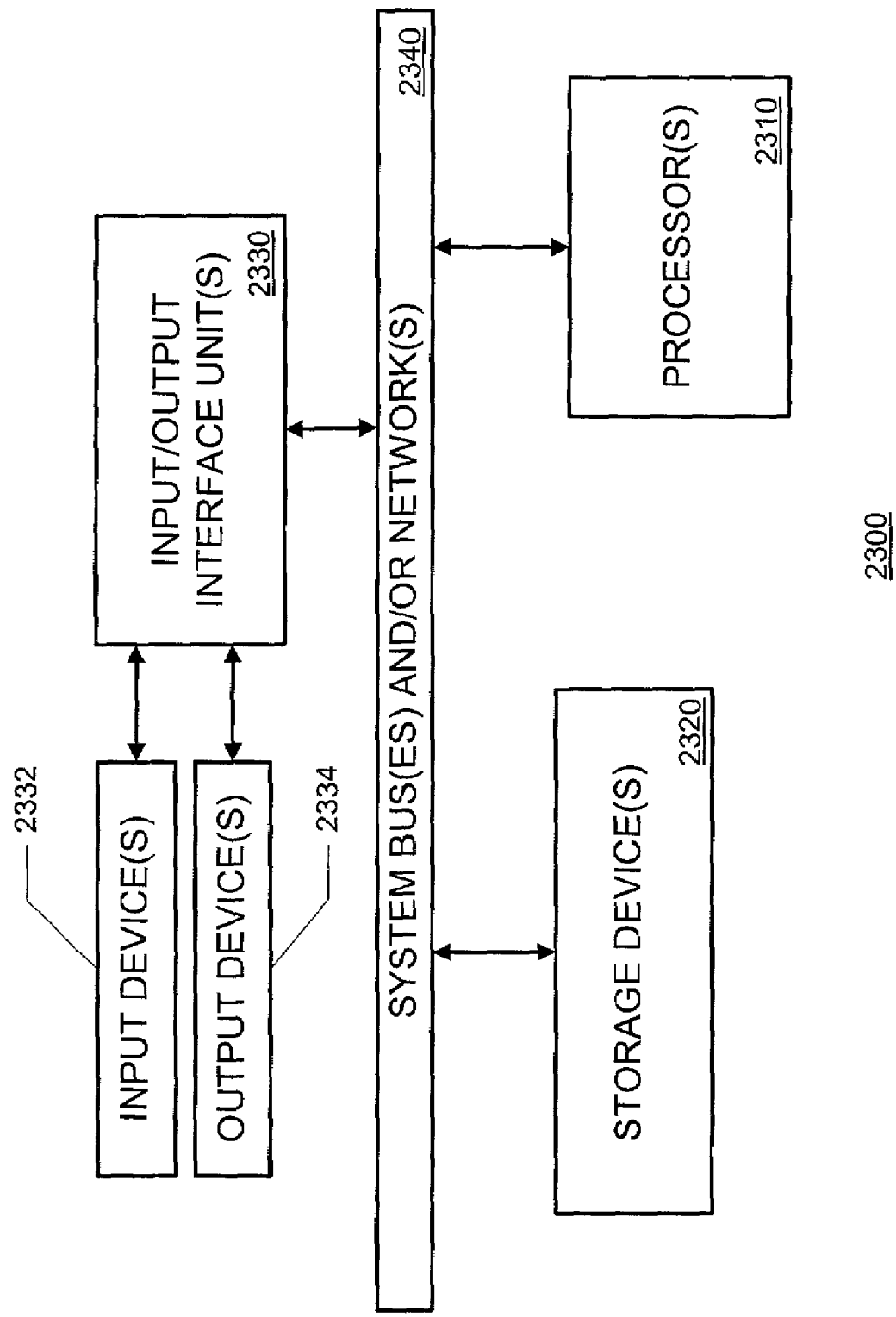
FIG. 23 illustrates an exemplary apparatus that may be used with the present invention.

FIG. 23 is high-level block diagram of a machine 2300 which may effect one or more of the operations discussed above. The machine 2300 basically includes a processor(s) 2310, an input/output interface unit(s) 2330, a storage device(s) 2320, and a system bus(es) and/or a network(s) 2340 for facilitating the communication of information among the coupled elements. An input device(s) 2332 and an output device(s) 2334 may be coupled with the input/output interface(s) 2330. Operations of the present invention may be effected by the processor(s) 2310 executing instructions. The instructions may be stored in the storage device(s) 2320 and/or received via the input/output interface(s) 23230. The instructions may be functionally grouped into processing modules.

The machine 2300 may be a switch fabric including a signal control processor for example. In an exemplary router, the processor(s) 2310 may include a microprocessor, a network processor, and/or (e.g., custom) integrated circuit(s). In a preferred embodiment of the invention, at least some of the processors (e.g., a signal control processor 330) may be field programmable gate arrays (FPGAs). In the exemplary router, the storage device(s) 2320 may include ROM, RAM, SDRAM, SRAM, SSRAM, DRAM, flash drive(s), hard disk drive(s), and/or flash cards. At least some of these storage device(s) 2320 may include program instructions. At least a portion of the machine executable instructions may be stored (temporarily or more permanently) on the storage device(s) 2320 and/or may be received from an external source via an input interface unit 2330. Some of the storage devices 3200 may include RAM or registers for defining, e.g., a routing table 345, a connectivity table 350, a CAC table 355, and a state table 360. Finally, in the exemplary router, the input/output interface unit(s) 2330, input device(s) 2332 and output device(s) 2334 may include interfaces to terminate communications links.

Naturally, the operations of the present invention may be effected on systems other than routers. Such other systems may employ different hardware and/or software.

§ 4.4 An Exemplary Embodiment

Figure 24:
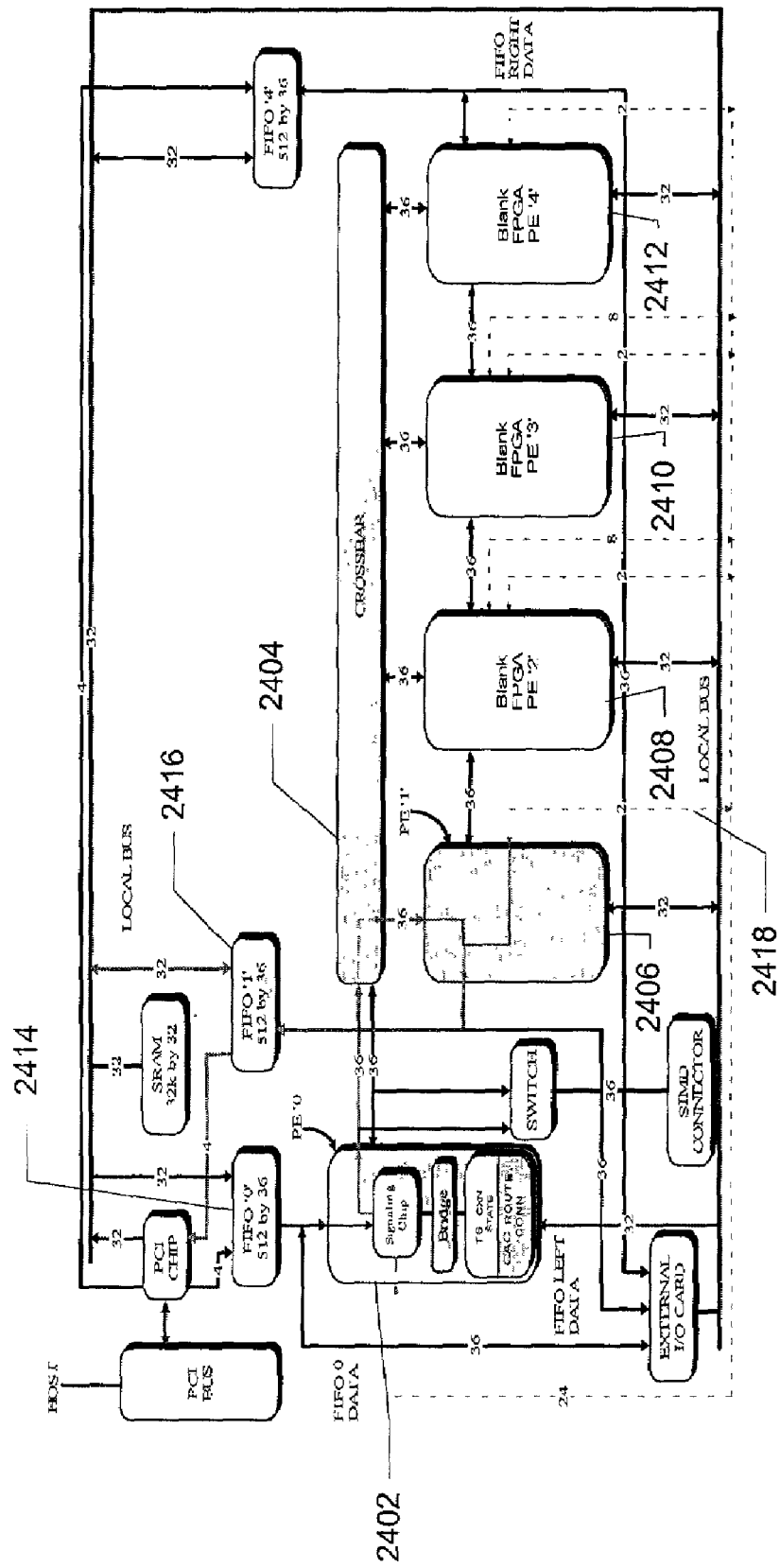
FIG. 24 illustrates the architecture of a WILDFORCE reconfigurable board.

An exemplary embodiment of the signaling protocol was implemented in field programmable gate arrays (FPGAs). The re-configurable nature of FPGAs allows the addition of more features (commands or extensions) to the base subset of four commands present in the current embodiment, if desired. For this exemplary embodiment, the sizes of the various tables are reduced in order to fit the memory and the signaling protocol state machine on a single Xilinx FPGA of a multi-FPGA WILDFORCE prototype board. The WILDORCE re-configurable board architecture 2400 is shown in FIG. 24. It includes six FPGAs 2402, 2404, 2406, 2408, 2410, 2412. Designs specified in VHDL hardware description language are synthesized and loaded into one or more of the FPGAs. A C language based library of APIs is used to configure the FPGAs with the signaling protocol, and to invoke this configured hardware signaling protocol to accelerate signaling message processing.

The configurable logic blocks (CLB) are the functional building block of the FPGAs. Each CLB in the Xilinx FPGAs is comprised of two four-input function generators and a pair of D-flip-flops. The largest FPGA on the WILDFORCE board has about 1200 CLBs. Simulation results have shown that this design consumes about 300 CLBs. Three FPGAs (PE0, PE1 and crossbar 2402, 2406, 2404), two FIFOs (FIFO0, FIFO1 22414, 2416) and a 128K RAM (not shown) are used to implement the signaling protocol. PE0 2402 implements the signaling protocol state machine 700 and the state and switch mapping tables 280, 290. The 128K RAM implements the routing, connectivity and CAC tables 265, 270, 285. The signaling messages are received via FIFO0 2414 connected to PE0 2404 and sent out via FIFO1 2416 connected to PE1 2406. A 2-bit control bus 2418 between PE0 and PE1 is used to carry a control signal from the signaling protocol state machine 700 to FIFO1 2416 and a control signal from FIFO1 2416 to the signaling protocol state machine 700.

The memory requirements of the signaling protocol exceed the memory resources available on the WILDFORCE board 2400. The routing, connectivity and CAC data 265, 270, 285 that is accessed by both the host and the signaling protocol state machine 700 may be implemented on a 128K RAM on a mezzanine card connected to PE0 2402. The state and switch mapping tables 280, 290 that are accessed by the signaling protocol state machine 700 are implemented on the PE0 2402 FPGA. The 128K mezzanine RAM has only a 24-bit address bus. Consequently, for this exemplary embodiment, the sizes of the routing, connectivity and CAC tables 265, 270, 285 are reduced. An exemplary connectivity table 2500 is shown in FIG. 25, an exemplary routing table 2600 is shown in FIG. 26 and an exemplary CAC table 2700 is shown in FIG. 27. Similarly, the sizes of the state and switch-mapping tables 280, 290 are reduced. An exemplary state table 2800 is shown in FIG. 28 and an exemplary switch mapping table 2900 is shown in FIG. 29. The exemplary embodiment supports 5-bit addresses for all nodes, 16 interfaces (e.g., ports) per switch, a maximum bandwidth of 16 OC1s and a maximum of 32 connection references at each switch.

Memory accesses represent the majority of the actions taken by the signaling processor. A unified approach to memory is desired to reduce complexity in the processor. The signaling protocol state machine 700 accesses the tables implemented in the Mezzanine RAM or in the PE0 2402 FPGA via a memory interface module. Therefore, implementation of the state machine 700 remains independent of the particular memory structures.

Generality is desired in the design of the state machine and the memory interfaces. The actions for each interface have been specified and general control signals have been developed. With slight modifications, the signaling state machine 700 can be interfaced with a wide range of memory modules. The chip select and write enable control signals are defined to support read, write, and pause actions as shown in Table 1 3000 of FIG. 30 by the signaling state machine 700. If the chip select signal is "0" and the write enable is "0", a write action occurs at the memory. If the chip select signal is "0" and the write enable is "1", a read action occurs at the memory. If the chip select signal is "1" and the write enable is "0", a pause action occurs at the memory, and if the chip select signal is "1" and the write enable is "1", no action occurs.

The signaling protocol state machine 700 uses these control signals, along with a table identifier, an address (and data when necessary) and interfaces with the specific data tables using the process shown in FIGS. 31 and 32. In FIG. 31 the processor method 3100 is described. The method 3100 starts at idle node 3104 and proceeds to block 3108. At block 3108, if the chip select signal is "0" and the write enable is either "0" or "1", the memory is being used. The method 3100 proceeds to block 3112. At block 3112, if the memory is not busy, then the method 3100 proceeds to block 3116, where the chip select signal is a "1". Then, the method 3100 returns to idle block 3104.

The state diagram of FIG. 32 illustrates the states of a memory interface. Beginning at node 3204. The memory interface is at a ready state. If the chip select signal is "0" and the write enable is "0", operation proceeds to node 3208, and the memory interface is in a write state. After the write state is complete the memory interface proceeds to node 3212 and enters a standby state.

Returning to node 3204, if the chip select signal is "0" and the write enable is "1", operation proceeds to node 3206, and the memory interface is in a read state. After the read state is complete the memory interface proceeds to node 3212 and enters a standby state. When the memory interface receives a chip select signal of "1", the memory interface returns to a ready state, node 3204.

§ 4.5 Simulation Results

In almost all or all signaling protocols, SETUP message processing consumes the most time. This includes the time spent on receiving the SETUP message, time spent on SETUP message processing and the time spent on transmitting a SETUP message. An exemplary VHDL model for the signaling protocol processor was developed and then compiled, simulated and synthesized it using Synplicity design tools set for a Xilinx 4036 XLA FPGA.

Figure 33:
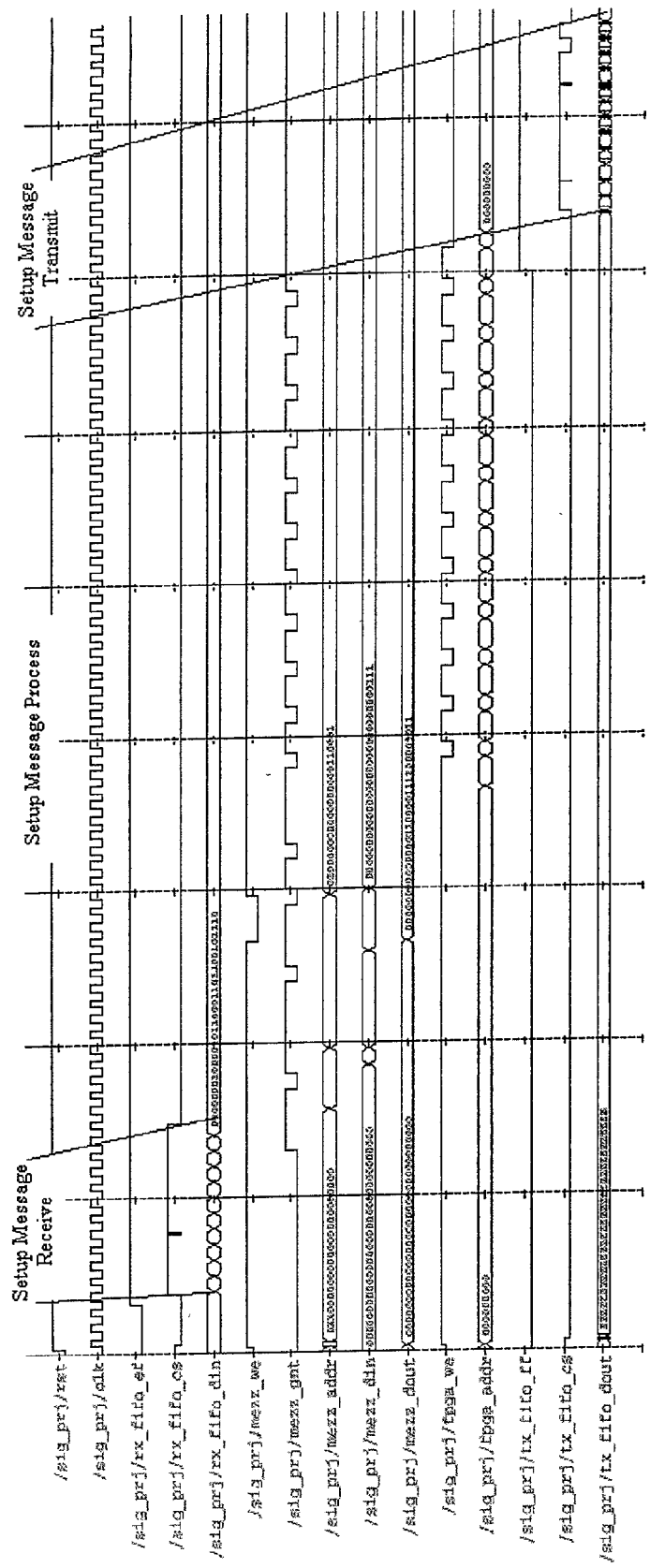
FIGS. 33–36 illustrate timing diagrams for an exemplary embodiment of the signaling protocol of the present invention implemented in hardware.
Figure 34:
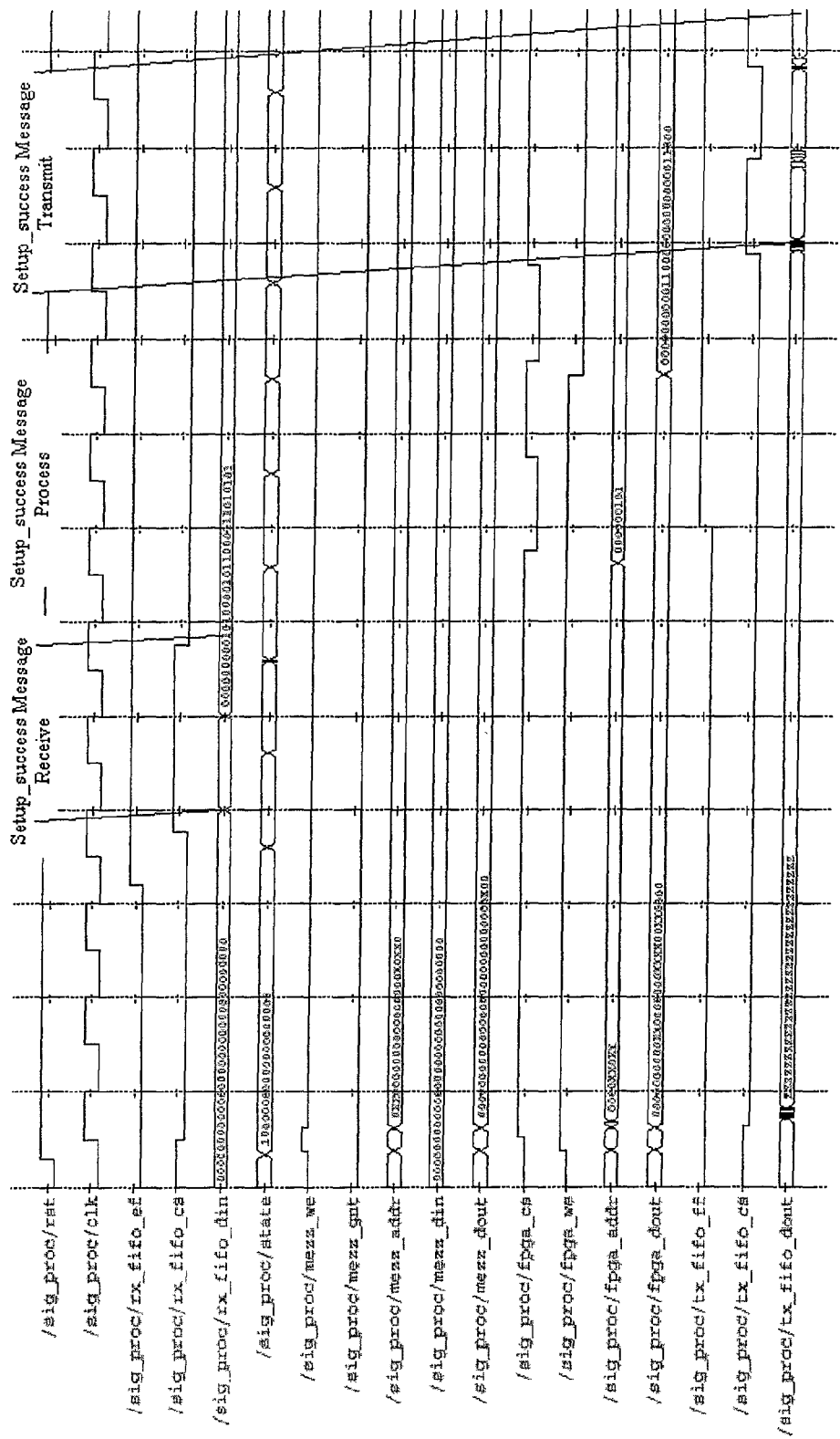
Figure 35:
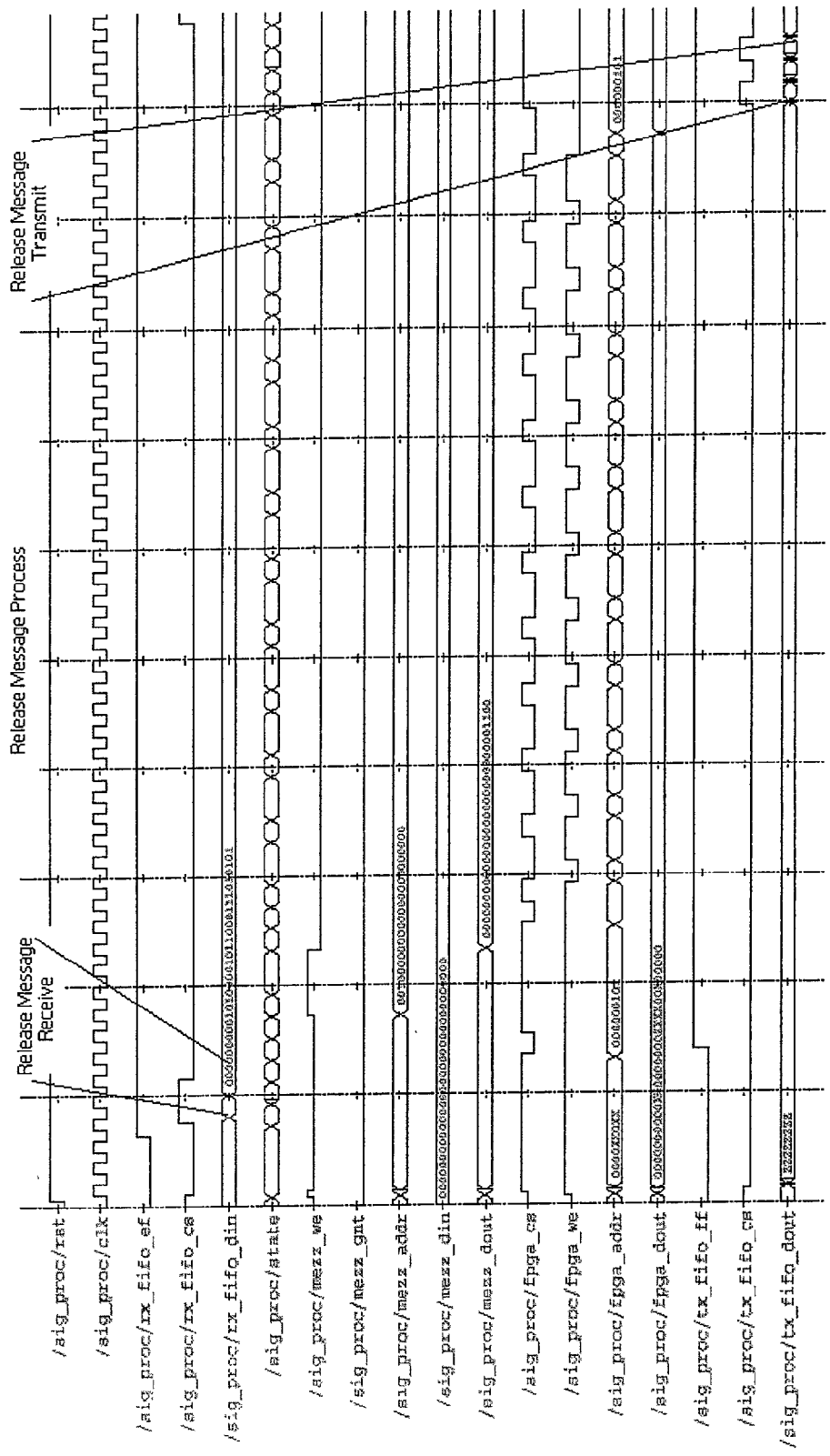
Figure 36:
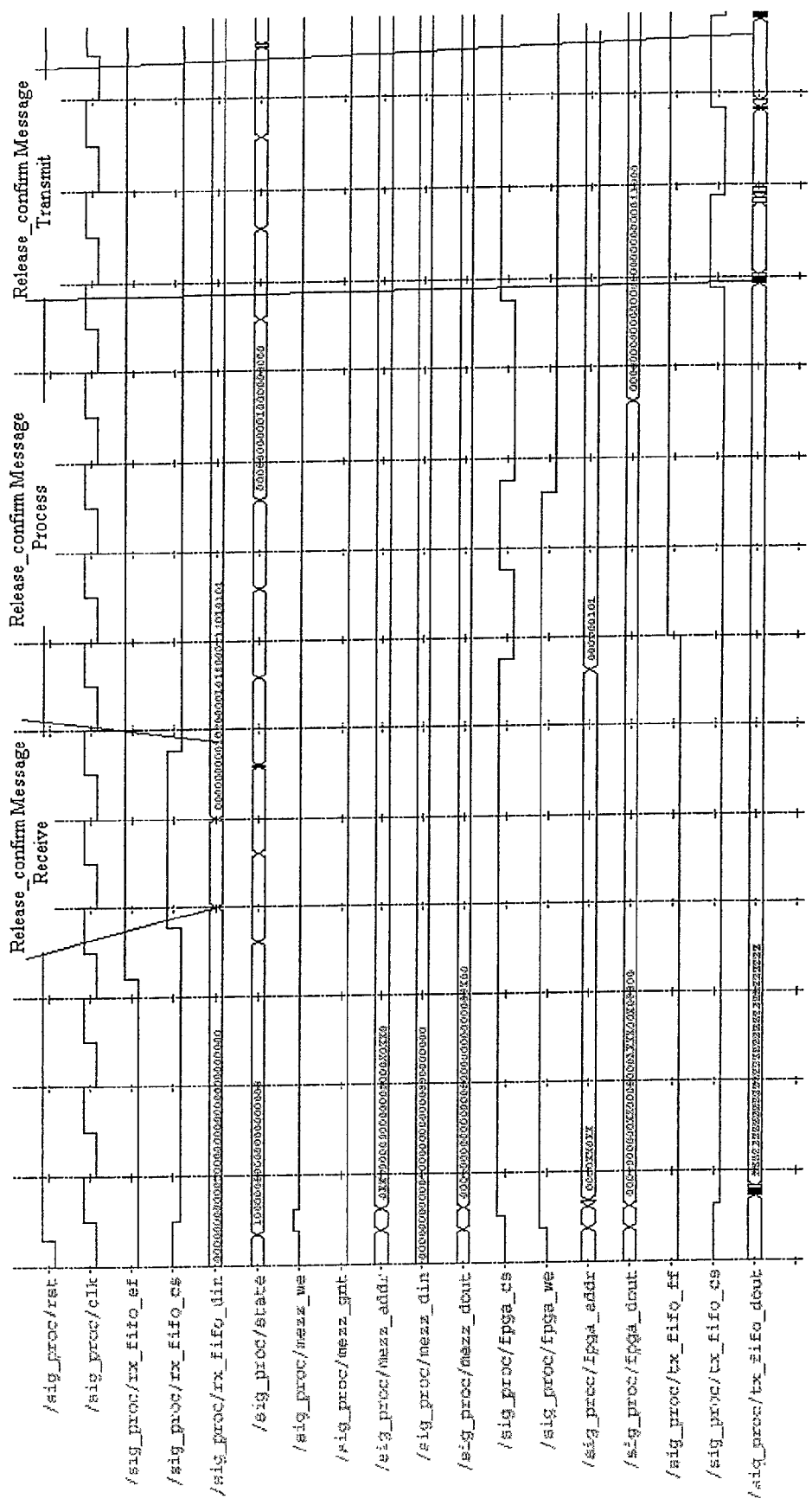

From the timing simulation of the SETUP message shown in FIG. 33 it can be seen that while receiving and transmitting a SETUP message (requesting a bandwidth of OC-12 at a cross-connect rate of OC-1) consumes 12 clock cycles each, SETUP message processing consumes 53 clock cycles. Overall, this translates into 77 clock cycles to receive, process and transmit a SETUP message. Processing SETUP SUCCESS (FIG. 34), RELEASE (FIG. 35) and RELEASE CONFIRM (FIG. 36) messages consumes about 70 clock cycles total since these messages are much shorter (2 32-bit words versus 11 32-bit words for SETUP) and requires simple processing. The breakdown of the timing for each message type is shown in Table 2 of FIG. 37. Assuming a slow 25 Mhz clock, this translates into 3.8 microseconds for SETUP message processing and about 2.8 microseconds for SETUP SUCCESS, RELEASE and RELEASE CONFIRM message processing combined. Thus, for a complete pull-up and pull-down of a connection the total time for signal processing is around 6.6 microseconds. Compare this with the 1–2 milliseconds it may take to process signaling messages in software. Using a slightly faster clock (50 MHz) halves these processing times. FPGAs with 100 MHz clocks are already on the market and using them will decrease the processing time of the messages even further. In addition, pipelined processing of signaling messages by selective duplication of the data path to further improve the throughput may be implemented. Overall, this exemplary embodiment of a signaling protocol in FPGA hardware has demonstrated the potential for being 1,000–10,000 times faster than software implementations.

§ 4.6 Conclusions

As demonstrated by the exemplary embodiment, the call handling capacities of a node may be increased by implementing a signaling protocol in hardware. Since establishing and releasing connections through a network are becoming important in both connection-oriented networks and connectionless networks emulating connection-oriented networks, the present invention solves a growing challenge.

The faster performance of the signaling protocol implemented in hardware decreases the overhead associated with setting up and releasing a connection. This lower overhead enables more data to be transmitted, and more calls to be handled at one time.

What is claimed is:

1. For use with a node of a communications network, a method for setting up a connection in response to a request, the method comprising:
   a) determining a next link of the connection based on routing information;
   b) determining whether the determined next link of the connection has sufficient capacity to meet that requested by the request;
   c) if the determined next link of the connection is determined to not have sufficient capacity to meet that requested by the request, repeating (b) and (c) at least once to try an alternative next link;
   d) if the determined next link of the connection is determined to have sufficient capacity to meet that requested by the request, then (i) updating connection admission control information to reflect the capacity requested by the request and (ii) further requesting a connection identifier;
   e) accepting a requested connection identifier received;
   f) providing an interface number and allocation control information to an interface associated with the interface number; and
   g) if an interface receives an interface number and allocation control information associated with the interface number, then
      i) determining a bit-vector corresponding to the interface number,
      ii) determining a first available part of the link, and
      iii) marking the bit vector such that bits corresponding to the determined first available part of the link are marked as unavailable.

2. The method of claim 1 wherein the link is a time division multiplexed link.

3. The method of claim 1 wherein the link is a wavelength division multiplexed link.

4. The method of claim 1 further comprising:
   h) accepting allocated capacity information;
   i) updating switch mapping information in response to the received allocated capacity information; and j) updating state information based on the allocated capacity information.

5. The method of claim 1 further comprising:
   h) accepting allocated capacity information;
   i) updating switch mapping information in response to the received allocated capacity information;
   j) updating state information based on the allocated capacity information; and
   k) generating a set up message including the connection identifier and the interface.

6. The method of claim 1 wherein the act of updating connection admission control information to reflect the capacity requested by the request if the determined next link of the connection is determined to have sufficient capacity to meet that requested by the request, includes decreasing the capacity of the link.

7. For use with a node of a communications network, the node having interfaces terminating communications links, an apparatus for setting up a connection in response to a request, the apparatus comprising:
   a) at least one storage device storing
      i) routing information;
      ii) connection admission control information; and
   b) a programmable device adapted to
      i) determine a next link of the connection based on the routing information;
      ii) determine whether the determined next link of the connection has sufficient capacity to meet that requested by the request of the call;
      iii) repeat (ii) and (ii) at least once to try an alternative next link if the next link of the connection is determined to not have sufficient capacity to meet that requested by the request;
      iv) update the connection admission control information to reflect the capacity requested by the request and request a connection identifier if the determined next link of the connection is determined to have sufficient capacity to meet that requested by the request
      v) accept a requested connection identifier;
      vi) provide an interface number and allocation control information to an interface associated with the interface number; and
      vii) if an interface receives an interface number and allocation control information associated with the interface number, then
         determining a bit-vector corresponding to the interface number,
         determining a first available part of the link, and
         marking the bit vector such that bits corresponding to the determined first available part of the link are marked as unavailable.

8. The apparatus of claim 7 wherein the programmable device is a field programmable gate array.

9. The device of claim 7 wherein the link is a time division multiplexed link.

10. The device of claim 7 wherein the link is a wavelength division multiplexed link.

11. The device of claim 7 wherein the programmable device is further adapted to
   accepting allocated capacity information;
   updating switch mapping information in response to the received allocated capacity information; and
   updating state information based on the allocated capacity information.

12. The apparatus of claim 7 wherein the programmable device is adapted to update the connection admission control information to decrease the capacity of the link to reflect the capacity requested by the request if the determined next link of the connection is determined to have sufficient capacity to meet that requested by the request.

13. For use in call signaling protocol, a method for use by a node of a communications network to determine a link of a connection, the method comprising:
   a) determining a next hop of the connection based on routing information;
   b) determining a link associated with the determined next hop;
   c) determining whether or not the determined link has sufficient communications resources to satisfy the call; and
   d) only if it is determined that the determined link has sufficient communication resources to satisfy the call, then allocating communication resources of the link to the call,
   wherein the link is a multiplexed link having channels, and
   wherein the act of allocating communication resources of the link to the call includes determining available channels of the link until the sum of capacity of the determined available channels is enough to satisfy the call.

14. The method of claim 13 wherein the communications resources is bandwidth.

15. The method of claim 13 wherein the link is a time division multiplexed link and wherein the channels are time-slots.

16. The method of claim 13 wherein the link is a wavelength division multiplexed link and wherein the channels are wavelengths.

17. For use in call signaling protocol, apparatus for use by a node of a communications network to determine a link of a connection, the apparatus comprising:
   a) means for determining a next hop of the connection based on routing information;
   b) means for determining a link associated with the determined next hop;
   c) means for determining whether or not the determined link has sufficient communications resources to satisfy the call; and
   d) means for allocating communication resources of the link to the call only if it is determined that the determined link has sufficient communication resources to satisfy the call,
   wherein the link is a multiplexed link having channels, and
   wherein the means for allocating communication resources of the link to the call includes means for determining available channels of the link until the sum of capacity of the determined available channels is enough to satisfy the call.

18. The apparatus of claim 17 wherein the communications resources is bandwidth.

19. The apparatus of claim 17 wherein the link is a time division multiplexed link and wherein the channels are time-slots.

20. The apparatus of claim 17 wherein the link is a wavelength division multiplexed link and wherein the channels are wavelengths.

* * * * *